US012763413B2

(12) United States Patent
Kwon

(10) Patent No.: US 12,763,413 B2
(45) Date of Patent: Oct. 13, 2026

(54) METHOD OF SEALING POUCH-TYPE BATTERY CASE AND POUCH-TYPE SECONDARY BATTERY

(71) Applicant: LG Energy Solution, Ltd., Seoul (KR)

(72) Inventor: Myung Bin Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 677 days.

(21) Appl. No.: 18/200,104

(22) Filed: May 22, 2023

(65) Prior Publication Data

US 2023/0402691 A1 Dec. 14, 2023

(30) Foreign Application Priority Data

Jun. 14, 2022 (KR) ........................ 10-2022-0072102

(51) Int. Cl.
*H01M 50/186* (2021.01)
*H01M 50/105* (2021.01)
*H01M 50/548* (2021.01)

(52) U.S. Cl.
CPC ....... *H01M 50/186* (2021.01); *H01M 50/105* (2021.01); *H01M 50/548* (2021.01)

(58) Field of Classification Search
CPC ............. H01M 50/105; H01M 50/186; H01M 10/058; H01M 50/184; H01M 10/04; H01M 50/178; H01M 10/0436; H01M 50/183
See application file for complete search history.

(56) References Cited

U.S. PATENT DOCUMENTS

2009/0311592 A1 12/2009 You et al.
2010/0028772 A1* 2/2010 Yang .................. H01M 50/578 429/185
2012/0028109 A1* 2/2012 Itoh ..................... H01M 50/105 429/163
2014/0090780 A1 4/2014 Jeong
2016/0093837 A1* 3/2016 Bushnell ............. H01M 50/105 29/623.2
2019/0393452 A1* 12/2019 Kim .................... H01M 50/124
2019/0393455 A1 12/2019 Seo et al.
(Continued)

FOREIGN PATENT DOCUMENTS

EP 1804315 B1 12/2013
JP 2021168226 A 10/2021
(Continued)

*Primary Examiner* — Imran Akram
(74) *Attorney, Agent, or Firm* — Lerner David LLP

(57) ABSTRACT

The present disclosure provides a method of sealing a pouch-type battery case including first and second case units. An electrode assembly accommodated in the first and second case units. The method including a bending operation, a first sealing operation, and a second sealing operation. Each of the first and second case units including an accommodation portion and an extension at least partially surrounding the accommodation portion. The electrode assembly being disposed between the accommodation portions of the first and second case units. First regions or second regions of the extensions of the first and second case units adjacent to an end portion of one side or the other are bonded. In the second sealing operation, seventh or eighth regions of the extensions of the first and second case units positioned at the one side or the other side of the electrode assembly facing each other are bonded.

9 Claims, 7 Drawing Sheets

(56) References Cited

U.S. PATENT DOCUMENTS

| | | | | |
|---|---|---|---|---|
| 2020/0067029 | A1 | 2/2020 | Park et al. | |
| 2020/0295315 | A1 | 9/2020 | Kim et al. | |
| 2022/0029192 | A1* | 1/2022 | Lee ..................... | H01M 50/105 |
| 2022/0109203 | A1* | 4/2022 | Oh ...................... | H01M 50/105 |
| 2022/0376288 | A1 | 11/2022 | Kwak | |
| 2022/0399600 | A1* | 12/2022 | Kong .................. | H01M 50/105 |
| 2022/0407105 | A1 | 12/2022 | Kwak | |
| 2023/0053218 | A1 | 2/2023 | Choi et al. | |
| 2023/0178791 | A1* | 6/2023 | Kim .................... | H01M 50/105 429/179 |

FOREIGN PATENT DOCUMENTS

| | | | |
|---|---|---|---|
| KR | 20070102768 | A | 10/2007 |
| KR | 20120126932 | A | 11/2012 |
| KR | 20140004305 | A | 1/2014 |
| KR | 20170132565 | A | 12/2017 |
| KR | 20180010563 | A | 1/2018 |
| KR | 20180028714 | A | 3/2018 |
| KR | 20190023649 | A | 3/2019 |
| KR | 20190024755 | A | 3/2019 |
| KR | 20190042797 | A | 4/2019 |
| KR | 20190055594 | A | 5/2019 |
| KR | 20210072316 | A | 6/2021 |
| KR | 20210072322 | A | 6/2021 |
| KR | 20210115865 | A | 9/2021 |
| KR | 20210129543 | A | 10/2021 |
| KR | 102367387 | B1 | 2/2022 |
| KR | 20220091378 | A | 6/2022 |

* cited by examiner

[FIG. 7]
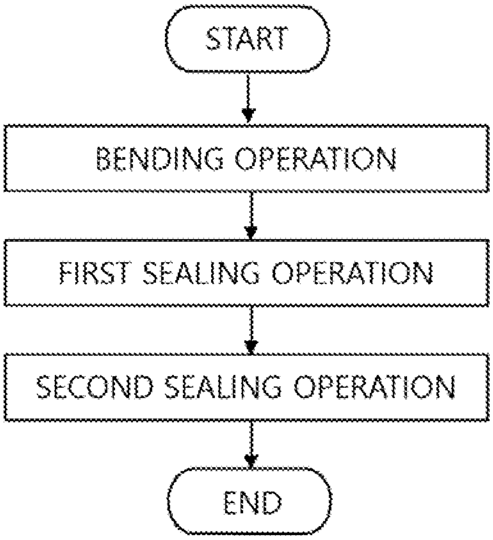

METHOD OF SEALING POUCH-TYPE BATTERY CASE AND POUCH-TYPE SECONDARY BATTERY

CROSS-REFERENCE TO RELATED APPLICATION

This application claims priority to and the benefit of Korean Patent Application No. 10-2022-0072102, filed on Jun. 14, 2022, the disclosure of which is incorporated herein by reference in its entirety.

FIELD OF DISCLOSURE

The present disclosure relates to a method of sealing a pouch-type battery case and a pouch-type secondary battery, and more specifically, to a method of sealing a pouch-type battery case and a pouch-type secondary battery that can prevent or reduce wrinkles generated on the pouch-type battery case.

BACKGROUND OF THE INVENTION

Secondary batteries are classified into cylindrical batteries, prismatic batteries, and pouch-type batteries according to shapes of cases thereof. Generally, a cylindrical battery and a prismatic battery are batteries having a structure in which an electrode assembly is installed in a metal can, and a pouch-type battery is a battery having a structure in which an electrode assembly is installed in a pouch-type case of an aluminum laminate sheet. Among them, pouch-type batteries that can be stacked with a high degree of integration, have a high energy density per weight, are inexpensive, and are easily deformable have recently attracted much attention.

The pouch-type battery may be formed by attaching two separate battery cases and may be formed by bending one laminate sheet.

When a pouch-type battery is formed by bending one laminate sheet, the battery case may include an accommodation part in which the electrode assembly is accommodated, a bent part that is bent, and a sealing part surrounding the accommodation part.

When the electrode assembly is disposed in the accommodation part and the bent part is bent, the laminate sheet can interfere with the electrode assembly and cannot be completely bent. This problem can occur when a size of the accommodation part is reduced, and a size of the electrode assembly is increased to increase an energy density of the pouch-type battery.

When the sealing part is thermally fused in a state in which the laminate sheet is not completely bent due to the interference with the electrode assembly, an amount of wrinkles generated on the battery case increases. Accordingly, since a defect rate and a defect misrecognition rate of the pouch-type battery increase, manufacturing costs and return/exchange costs of the pouch-type battery can increase, and the aesthetic sense can be reduced, thereby reducing a desire to purchase.

BRIEF SUMMARY OF THE DISCLOSURE

The present disclosure is directed to providing a method of sealing a pouch-type battery case and a pouch-type secondary battery to prevent or reduce wrinkles generated on the pouch-type battery case at low cost by using a simple configuration.

The present disclosure is directed to providing a method of sealing a pouch-type battery case and a pouch-type secondary battery, that can use a conventional pouch-type battery case and a conventional manufacturing device without requiring any changes.

Objects of the present disclosure are not limited to the above-described objects, and other objects and advantages of the present disclosure will be understood by the following description and will be more definitely understood through the embodiments of the present disclosure. It is also to be easily understood that the objectives and advantages of the present disclosure may be realized and attained by means and a combination thereof described in the appended claims.

The present disclosure provides a method of sealing a pouch-type battery case including a bending operation, a first sealing operation, and a second sealing operation.

The pouch-type battery case may include a first case unit and a second case unit.

The first case unit may extend in a first direction and a second direction intersecting the first direction.

An end portion of the second case unit in the first direction may be connected to an end portion of one side of the first case unit in the first direction.

The second case unit may be bent relatively with respect to the first case unit to cover the first case unit.

An electrode assembly may be accommodated between the first case unit and the second case unit.

Each of the first case unit and the second case unit may include an accommodation portion and an extension.

The accommodation portions of the first case unit and the second case unit may be in contact with or may face the electrode assembly.

The extensions of the first case unit and the second case unit may extend outward from the accommodation portions.

The extensions of the first case unit and the second case unit may at least partially surround the accommodation portions.

The extensions of the first case unit and the second case unit may be bonded.

In the bending operation, the electrode assembly may be positioned on the accommodation portion of the first case unit or the second case unit.

In addition, the end portion of the second case unit in the first direction connected to the first case unit may be bent relatively with respect to the first case unit so that the first case unit and the second case unit may face each other in a third direction intersecting the first direction and the second direction.

Accordingly, the electrode assembly may be disposed between the accommodation portions of the first case unit and the second case unit.

The first sealing operation may be performed after the bending operation.

In the first sealing operation, first regions of the extensions of the first case unit and the second case unit, which are adjacent to an end portion of one side in the second direction at an end portion of the other side of the electrode assembly in the first direction and face each other, may be bonded, or second regions of the extensions of the first case unit and the second case unit, which are adjacent to an end portion of the other side in the second direction at the end portion of the other side of the electrode assembly in the first direction and face each other, may be bonded.

The second sealing operation may be performed after the first sealing operation.

In the second sealing operation, seventh regions of the extensions of the first case unit and the second case unit, which are positioned at one side of the electrode assembly in the second direction and face each other, may be bonded, or eighth regions of the extensions of the first case unit and the second case unit, which are positioned at the other side of the electrode assembly in the second direction and face each other, may be bonded.

In one embodiment, the accommodation portion of the second case unit may have a concave shape to accommodate at least a part of the electrode assembly.

In the bending operation, the electrode assembly may be positioned on the accommodation portion of the first case unit, and the end portion of the second case unit in the first direction connected to the first case unit may be bent relatively with respect to the first case unit to accommodate at least a part of the electrode assembly in the accommodation portion of the second case unit.

In one embodiment, in the first sealing operation, the first regions of the first case unit and the second case unit facing each other may be bonded, and the second regions of the first case unit and the second case unit facing each other may be bonded.

In the second sealing operation, the seventh regions of the first case unit and the second case unit facing each other may be bonded, and the eighth regions of the first case unit and the second case unit facing each other may be bonded.

In one embodiment, lengths of the first regions of the first case unit and the second case unit in the first direction bonded in the first sealing operation or lengths of the second regions of the first case unit and the second case unit in the first direction bonded in the first sealing operation may each be smaller than a length of the electrode assembly in the first direction.

In one embodiment, the other end in the first direction of the end portion of the one side in the second direction at the end portion of the other side of the electrode assembly in the first direction may be positioned between one end and the other end in the first direction of each of the first regions of the first case unit and the second case unit bonded in the first sealing operation.

In one embodiment, the other end in the first direction of the end portion of the other side in the second direction at the end portion of the other side of the electrode assembly in the first direction may be positioned between one end and the other end in the first direction of each of the second regions of the first case unit and the second case unit bonded in the first sealing operation.

In one embodiment, the first regions of the first case unit and the second case unit bonded in the first sealing operation may be positioned at the one side of the electrode assembly in the second direction, or the second regions of the first case unit and the second case unit bonded in the first sealing operation may be positioned at the other side of the electrode assembly in the second direction.

In one embodiment, the first regions of the first case unit and the second case unit bonded in the first sealing operation may be included in the seventh regions of the first case unit and the second case unit bonded in the second sealing operation, or the second regions of the first case unit and the second case unit bonded in the first sealing operation may be included in the eighth regions of the first case unit and the second case unit bonded in the second sealing operation.

In one embodiment, the electrode assembly may have a quadrangular cross section extending in the first direction and the second direction.

Accordingly, the electrode assembly may include a first corner, a second corner, a third corner, and a fourth corner.

The first corner may be positioned at the one side in the first direction and the one side in the second direction.

The second corner may be positioned at the one side in the first direction and the other side in the second direction.

The third corner may be positioned at the other side in the first direction and the one side in the second direction.

The fourth corner may be positioned at the other side in the first direction and the other side in the second direction.

In the first sealing operation, the first region may be adjacent to the third corner, and the second region may be adjacent to the fourth corner.

In one embodiment, in the first sealing operation, third regions, fifth regions, fourth regions, or sixth regions of the extensions of the first case unit and the second case unit may be further bonded.

The third regions of the extensions of the first case unit and the second case unit may be positioned at one side of the first regions of the first case unit and the second case unit in the first direction and may face each other.

The fifth regions of the extensions of the first case unit and the second case unit may be positioned at the other side of the first regions of the first case unit and the second case unit in the first direction and may face each other.

The fourth regions of the extensions of the first case unit and the second case unit may be positioned at the one side of the second regions of the first case unit and the second case unit in the first direction and may face each other.

The sixth regions of the extensions of the first case unit and the second case unit may be positioned at the other side of the second regions of the first case unit and the second case unit in the first direction and may face each other.

In addition, the present disclosure provides a pouch-type secondary battery manufactured using the method of sealing the pouch-type battery case.

In addition, the present disclosure provides a pouch-type secondary battery including a battery case and an electrode assembly.

The battery case may include a first case unit and a second case unit.

The first case unit may extend in a first direction and a second direction intersecting the first direction.

An end portion of the second case unit in the first direction may be connected to an end portion of one side of the first case unit in the first direction.

The second case unit may be bent relatively with respect to the first case unit to face the first case unit in the third direction intersecting the first direction and the second direction.

The second case unit may cover the first case unit.

The electrode assembly may be accommodated between the first case unit and the second case unit.

Each of the first case unit and the second case unit may include an accommodation portion and an extension.

The accommodation portions of the first case unit and the second case unit may be in contact with or may face the electrode assembly.

The extensions of the first case unit and the second case unit may extend outward from the accommodation portions.

The extensions of the first case unit and the second case unit may at least partially surround the accommodation portions.

The extensions of the first case unit and the second case unit may be bonded.

The electrode assembly may be disposed between the accommodation portions of the first case unit and the second case unit.

The extensions of the first case unit and the second case unit may include first sealing regions which are bonded to face each other and second sealing regions which are bonded to face each other after the first sealing regions are bonded.

The first sealing regions may include first regions of the extensions of the first case unit and the second case unit, which are adjacent to an end portion of one side in the second direction at an end portion of the other side of the electrode assembly in the first direction and face each other, or second regions of the extensions of the first case unit and the second case unit which are adjacent to an end portion of the other side in the second direction at the end portion of the other side of the electrode assembly in the first direction and face each other.

The second sealing regions may include seventh regions of the extensions of the first case unit and the second case unit, which are positioned at one side of the electrode assembly in the second direction and face each other, or eighth regions of the extensions of the first case unit and the second case unit which are positioned at the other side of the electrode assembly in the second direction and face each other.

In one embodiment, the accommodation portion of the second case unit may have a concave shape to accommodate at least a part of the electrode assembly.

In one embodiment, the first sealing regions of the first case unit and the second case unit may include the first regions and the second regions of the first case unit and the second case unit.

The second sealing regions of the first case unit and the second case unit may include the seventh regions and the eighth regions of the first case unit and the second case unit.

In one embodiment, lengths of the first regions of the first case unit and the second case unit in the first direction may each be smaller than a length of the electrode assembly in the first direction or lengths of the second regions of the first case unit and the second case unit in the first direction may each be smaller than the length of the electrode assembly in the first direction.

In one embodiment, the other end in the first direction of the end portion of the one side in the second direction at the end portion of the other side of the electrode assembly in the first direction may be positioned between one end and the other end in the first direction of each of the first regions of the first case unit and the second case unit.

In one embodiment, the other end in the first direction of the end portion of the other side in the second direction at the end portion of the other side of the electrode assembly in the first direction may be positioned between one end and the other end in the first direction of each of the second regions of the first case unit and the second case unit.

In one embodiment, the first regions of the first case unit and the second case unit may be positioned at the one side of the electrode assembly in the second direction, or the second regions of the first case unit and the second case unit may be positioned at the other side of the electrode assembly in the second direction.

In one embodiment, the first regions of the first case unit and the second case unit included in the first sealing regions may be included in the seventh regions of the first case unit and the second case unit included in the second sealing regions, or the second regions of the first case unit and the second case unit included in the first sealing regions may be included in the eighth regions of the first case unit and the second case unit included in the second sealing regions.

In one embodiment, the electrode assembly may have a quadrangle cross section extending in the first direction and the second direction.

Accordingly, the electrode assembly may include a first corner, a second corner, a third corner, and a fourth corner.

The first corner may be positioned at the one side in the first direction and the one side in the second direction.

The second corner may be positioned at the one side in the first direction and the other side in the second direction.

The third corner may be positioned at the other side in the first direction and the one side in the second direction.

The fourth corner may be positioned at the other side in the first direction and the other side in the second direction.

The first regions may be adjacent to the third corner.

The second regions may be adjacent to the fourth corner.

In one embodiment, the first sealing regions may further include third regions, fifth regions, fourth regions, or sixth regions of the extensions of the first case unit and the second case unit.

The third regions of the extensions of the first case unit and the second case unit may be positioned at one side of the first regions of the first case unit and the second case unit in the first direction and may face each other.

The fifth regions of the extensions of the first case unit and the second case unit may be positioned at the other side of the first regions of the first case unit and the second case unit in the first direction and may face each other.

The fourth regions of the extensions of the first case unit and the second case unit may be positioned at the one side of the second regions of the first case unit and the second case unit in the first direction and may face each other.

The sixth regions of the extensions of the first case unit and the second case unit may be positioned at the other side of the second regions of the first case unit and the second case unit in the first direction and may face each other.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 7 is a flowchart of a method of sealing a pouch-type battery case according to one embodiment of the present disclosure.

DETAILED DESCRIPTION

Figure 1:
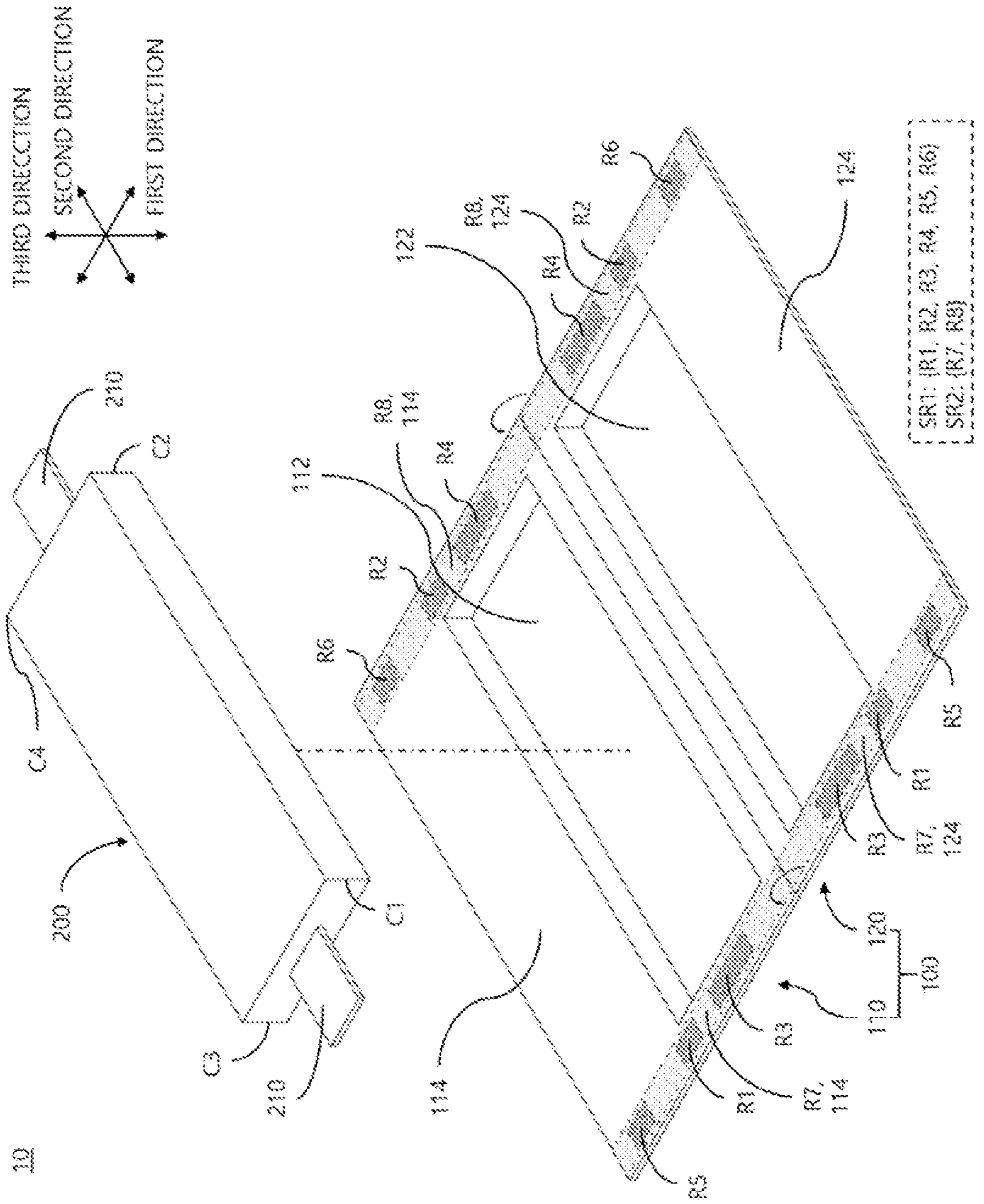
FIG. 1 is an exploded perspective view schematically showing a pouch-type secondary battery including a pouch-type battery case and an electrode assembly according to one embodiment of the present disclosure.

The above objects, features and advantages will be described below in detail with reference to the accompanying drawings, and accordingly, those skilled in the art to which the present disclosure belongs will be able to easily implement the technical idea of the present disclosure. In describing the present disclosure, if it is determined that the detailed description of the known technology related to the present disclosure may unnecessarily obscure the subject matter of the present disclosure, the detailed description will be omitted. Hereinafter, exemplary embodiments according to the present disclosure will be described in detail with reference to the accompanying drawings. In the drawings, the same reference numerals are used to indicate the same or similar components.

Although “first,” “second,” and the like may be used to describe various components, these components are not limited by these terms. These terms are only used to distinguish one component from another component, and unless otherwise stated, the first component may be the second component.

Throughout the specification, unless otherwise stated, each component may be singular or plural.

Hereinafter, the arrangement of an arbitrary component on the “upper portion (or lower portion)” or “upper (or lower)” of a component means that an arbitrary component is placed in contact with the upper (or lower) surface of the component. In addition, it may mean that other components may be interposed between the component and any component disposed on (or under) the component.

In addition, when a component is described as “linked,” “coupled,” or “connected” to another component, the components may be directly connected or connected to each other, but other components may be “interposed” between each component, each component may be “linked,” “coupled,” or “connected” through other components.

Singular expressions used herein include plural expressions unless the context clearly dictates otherwise. In this application, terms such as “consisting of” or “comprising” should not be construed as necessarily including all of the various components or steps described in the specification. It should be construed that it may not include some of the components or some of the steps, or further include additional components or steps.

Figure 2:
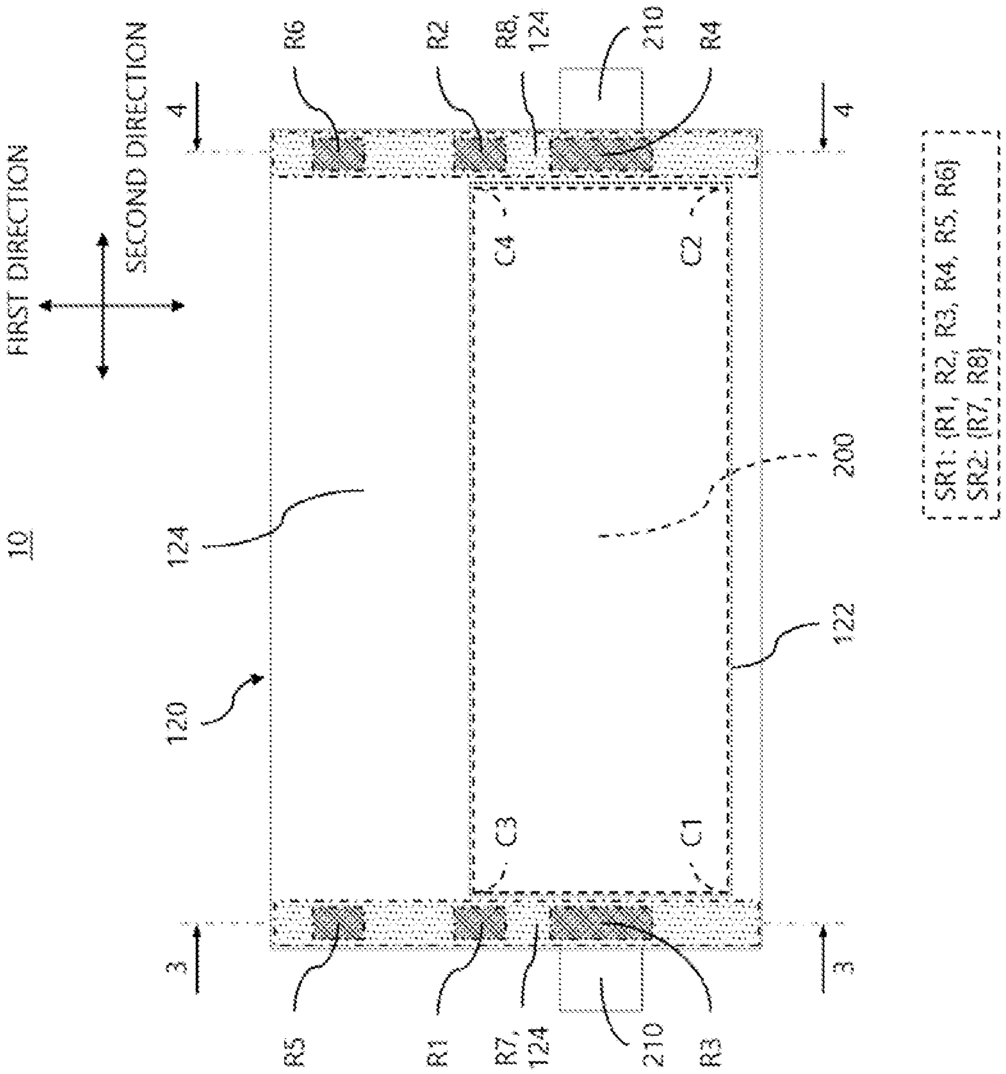
FIG. 2 is a plan view of the pouch-type secondary battery in FIG. 1 showing a state in which the pouch-type battery case in FIG. 1 is bent and folded to accommodates the electrode assembly therein.
Figure 3:
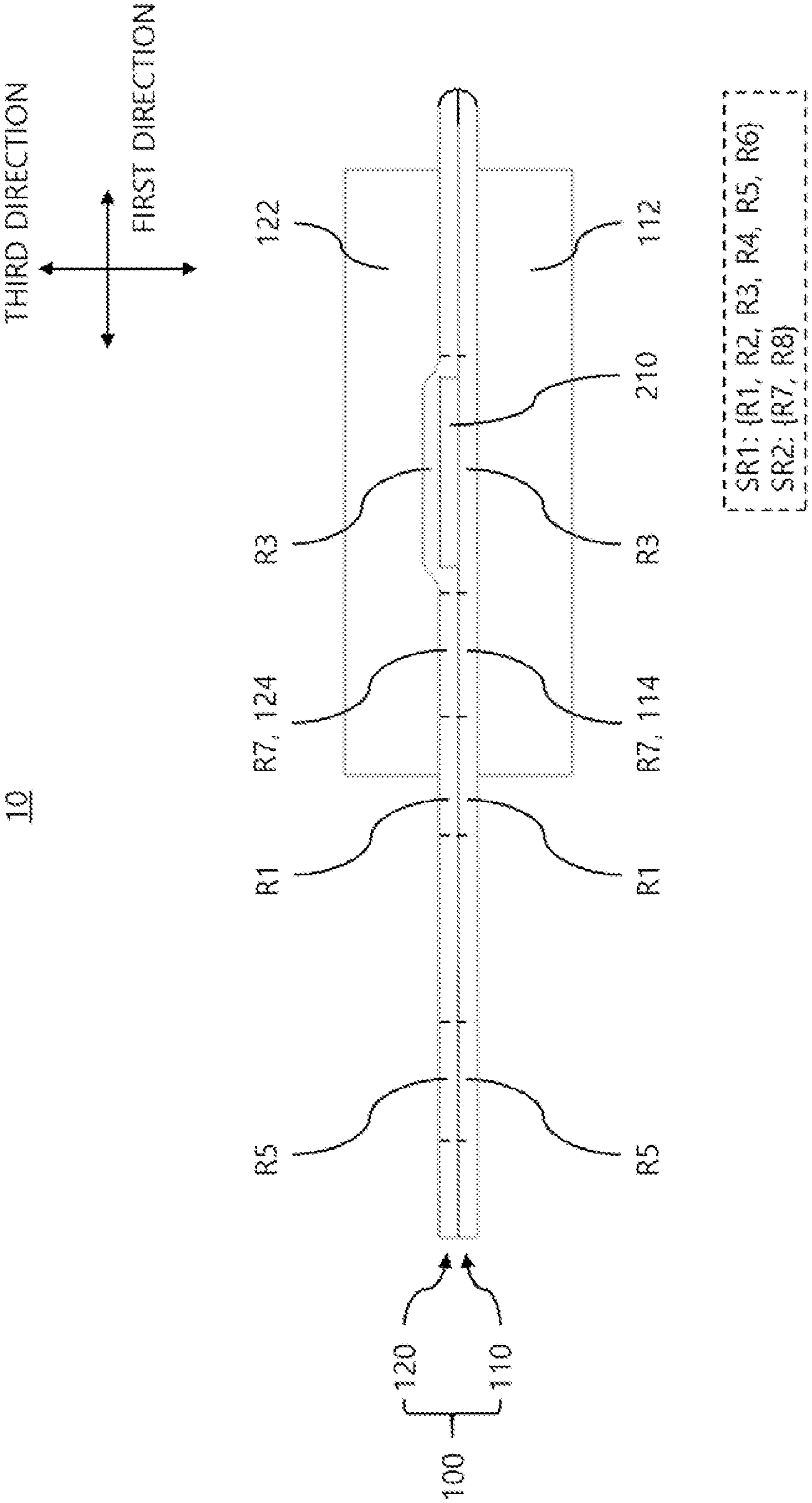
FIG. 3 is a cross-sectional view along line 3-3 of FIG. 2.
Figure 4:
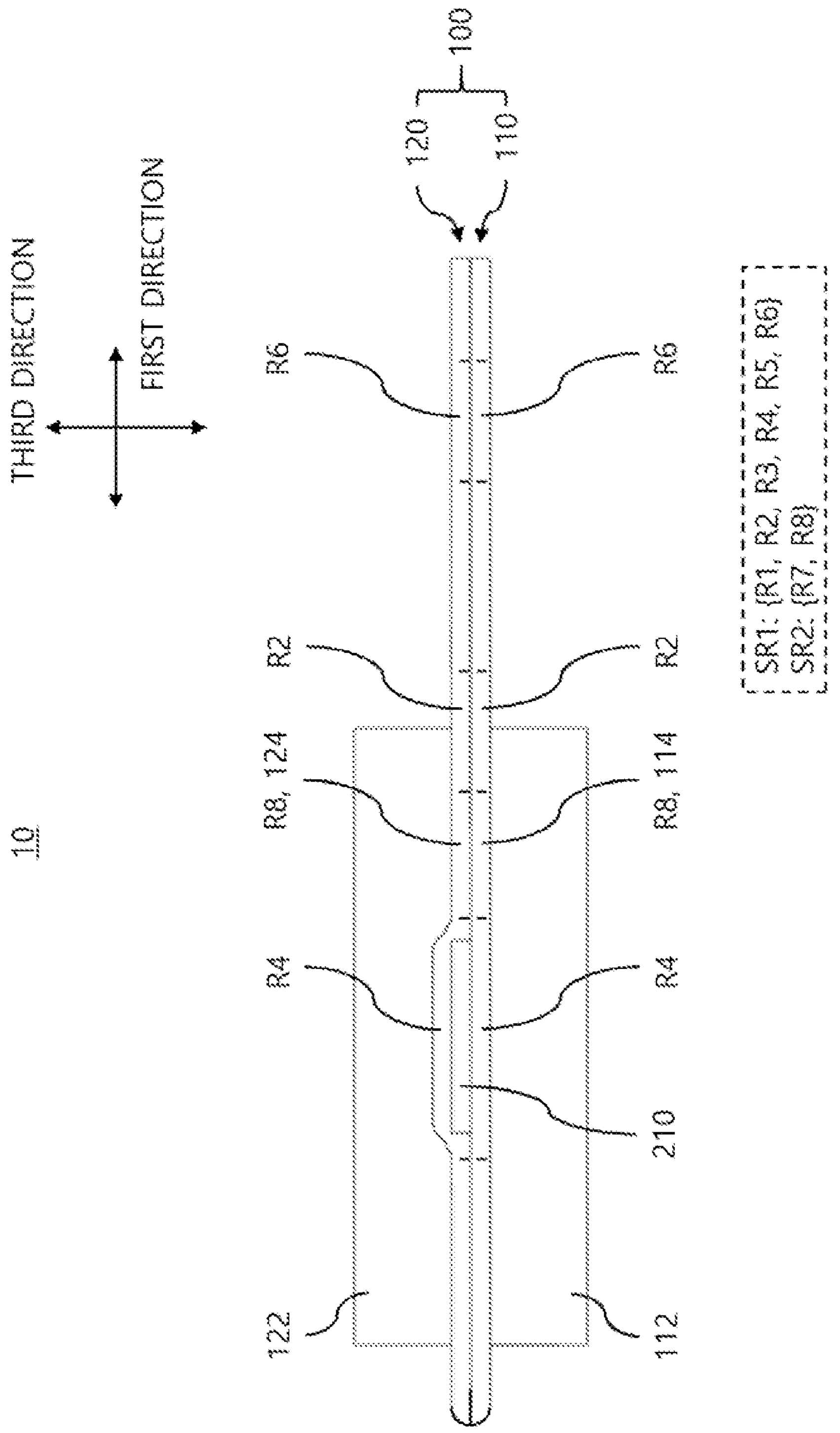
FIG. 4 is a cross-sectional view along line 4-4 of FIG. 2.
Figure 5:
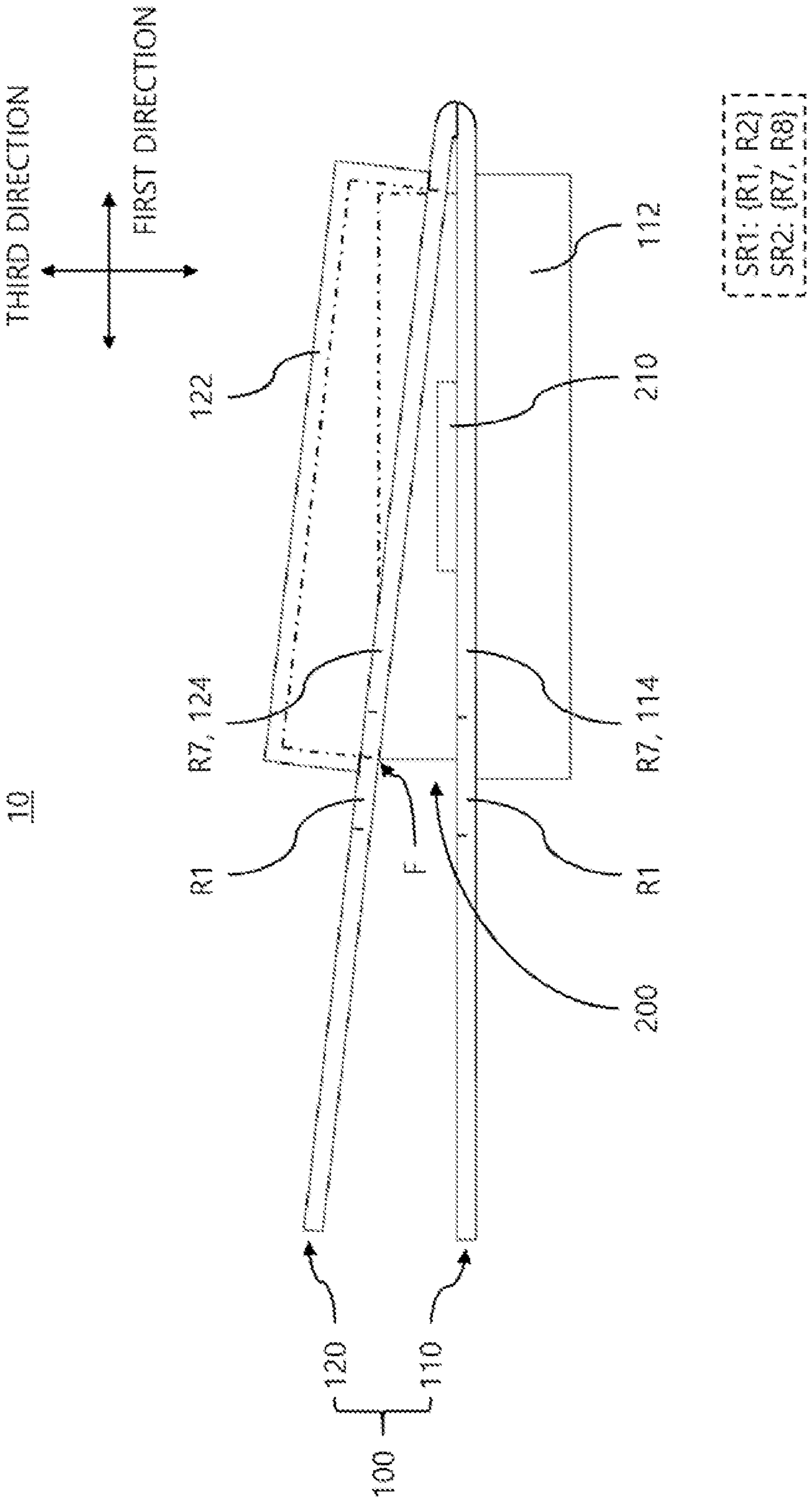
FIG. 5 is a schematic view showing the pouch-type battery case of FIG. 1 interfering with the electrode assembly disposed inside the pouch-type battery case when bent.
Figure 6:
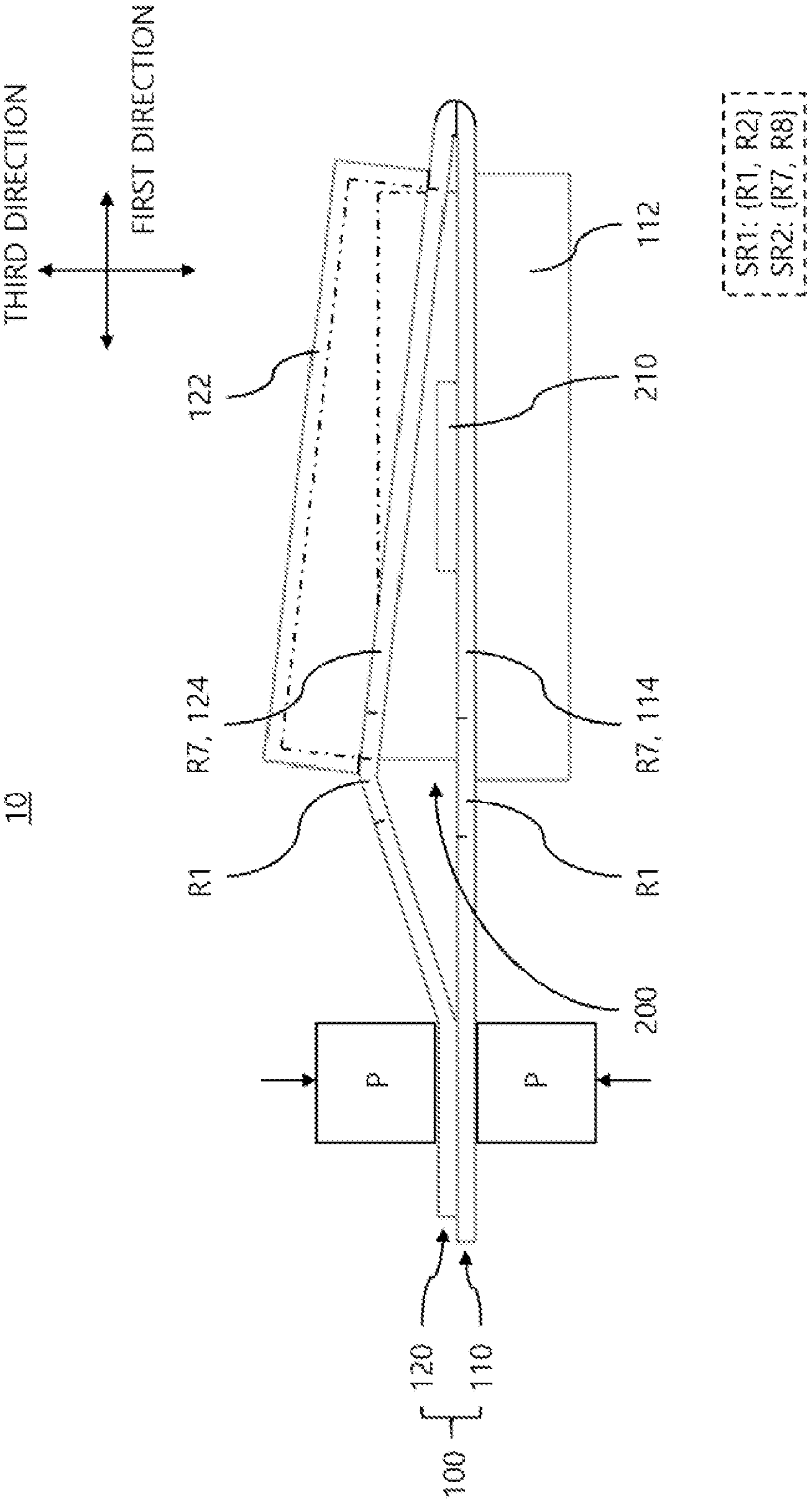
FIG. 6 is a schematic view showing a part of a sealing region bonded subsequent to the state shown in FIG. 5.

FIG. 1 is an exploded perspective view schematically showing a pouch-type secondary battery including a pouch-type battery case and an electrode assembly according to one embodiment of the present disclosure and is a view showing a sealing region in the pouch-type battery case. FIG. 2 is a plan view of the pouch-type secondary battery in FIG. 1 showing a state in which the pouch-type battery case in FIG. 1 is bent and folded and accommodates the electrode assembly therein and a view showing the sealing region in the pouch-type battery case. FIG. 3 is a cross-sectional view along line 3-3 in FIG. 2, and FIG. 4 is a cross-sectional view along line 4-4 in FIG. 2. FIG. 5 is a state view showing a state in which the pouch-type battery case in FIG. 1 is interfered with the electrode assembly disposed inside the pouch-type battery case when bent. FIG. 6 is a state view when a part of the sealing region is bonded in the state of FIG. 5.

Referring to FIGS. 1 to 4, a pouch-type secondary battery 10 according to one embodiment may include a pouch-type battery case 100 and an electrode assembly 200. After describing the electrode assembly 200, the pouch type battery case 100 will be described.

The electrode assembly 200 may be accommodated inside the pouch-type battery case 100 (see FIGS. 1 and 2). Specifically, the electrode assembly 200 may be accommodated between a first case unit 110 and a second case unit 120 of the pouch-type battery case 100. For example, the electrode assembly 200 may be accommodated between accommodation portions 112 and 122, which will be described below, of the first case unit 110 and the second case unit 120 of the pouch-type battery case 100 (see FIGS. 1 to 4).

The electrode assembly 200 may include one or more electrodes (not shown) and one or more separators (not shown). The electrodes and the separators may be alternately stacked in a third direction (e.g., a vertical direction).

Each electrode and each separator may extend in a first direction (e.g., a front-rear direction) and a second direction (e.g., a left-right direction). Accordingly, the cross section of the electrode assembly 200 may extend in the first direction and the second direction.

The electrode assembly 200 may have a quadrangular cross section extending in the first direction and the second direction. Accordingly, the electrode assembly 200 may include a first corner C1 positioned at one side (e.g., a rear side) in the first direction and one side (e.g., a left side) in the second direction, a second corner C2 positioned at the one side in the first direction and the other side (e.g., a right side) in the second direction, a third corner C3 positioned at the other side in the first direction (e.g., front side) and the one side in the second direction, and a fourth corner C4 positioned at the other side in the first direction and the other side in the second direction (see FIGS. 1 and 2).

The electrode assembly 200 may include a pair of terminals 210. The pair of terminals 210 may protrude in the second direction.

Meanwhile, in order to increase the energy density of the pouch-type secondary battery the size of the electrode assembly 200 (e.g., a width of the electrode assembly in the third direction) is gradually increasing. This will be described below.

The pouch-type battery case 100 may include the first case unit 110 and the second case unit 120.

The first case unit 110 may extend in the first direction (e.g., the front-rear direction) and the second direction (e.g., the left-right direction) intersecting the first direction.

Here, the first direction, the second direction, and the third direction, which have been described above or will be described below, may be defined based on the first case unit 110.

The second case unit 120 may extend in the first direction and the second direction like the first case unit 110.

An end portion of the second case unit 120 in the first direction may be connected to an end portion of one side (e.g., the rear side) of the first case unit 110 in the first direction. Accordingly, as indicated by an arrow in FIG. 1 marked on a portion in which the first case unit 110 and the second case unit 120 are connected, the second case unit 120 may be bent relatively with respect to the first case unit 110 to face the first case unit 110 in the third direction (e.g., the vertical direction) intersecting the first direction and the second direction as shown in FIGS. 2 to 4. In addition, the second case unit 120 may be bent relative with respect to the first case unit 110 to cover the first case unit 110 (see FIGS. 2 to 4). For example, the end portion of the second case unit 120 in the first direction connected to the first case unit 110 may be bent so that the second case unit 120 may face the first case unit 110 in the third direction and cover the first case unit 110.

Here, when the second case unit 120 faces the first case unit 110 in the third direction as shown in FIGS. 2 to 4, the end portion of the second case unit 120 in the first direction connected to the first case unit 110 may be the end portion of the one side (e.g., the rear side) of the second case unit 120 in the first direction.

The second case unit 120 may face the first case unit 110 in the third direction with the electrode assembly 200 interposed therebetween and cover the first case unit 110 (see FIGS. 2 to 4). Accordingly, as described above, the electrode assembly 200 may be accommodated between the first case unit 110 and the second case unit 120.

Each of the first case unit 110 and the second case unit 120 may include the accommodation portion 112 or 122 and an extension 114 or 124.

The accommodation portions 112 and 122 of the first case unit 110 and the second case unit 120 may be in contact with or face the electrode assembly 200. Specifically, the electrode assembly 200 may be disposed between the accommodation portions 112 and 122 of the first case unit 110 and the second case unit 120 (see FIGS. 1 to 4).

The accommodation portions 112 and/or 122 of the first case unit 110 and/or the second case unit 120 may have the concave shape to accommodate at least a part of the electrode assembly 200.

The extensions 114 and 124 of the first case unit 110 and the second case unit 120 may respectively extend outward from the accommodation portions 112 and 122 of the first case unit 110 and the second case unit 120. The extensions 114 and 124 of the first case unit 110 and the second case unit 120 may at least partially surround the accommodation portions 112 and 122 of the first case unit 110 and the second case unit 120. The extensions 114 and 124 of the first case unit 110 and the second case unit 120 may be bonded to face each other in the third direction.

The extensions 114 and 124 of the first case unit 110 and the second case unit 120 may have first sealing regions SR1 and second sealing regions SR2 that are bonded to face each other.

The first sealing regions SR1 may be, for example, regions of at least a part of the extensions 114 and 124 of the first case unit 110 and the second case unit 120 bonded in a pre-sealing process. Here, the pre-sealing process may be a preliminary sealing process performed before a main sealing process is performed.

The first sealing regions SR1 may include first regions R1 of the extensions 114 and 124 of the first case unit 110 and the second case unit 120 or include second regions R2 of the extensions 114 and 124 of the first case unit 110 and the second case unit 120.

The first regions R1 of the extensions 114 and 124 of the first case unit 110 and the second case unit 120 may be adjacent to the end portion of the one side (e.g., the left side) in the second direction at the end portion of the other side (e.g., the front side) of the electrode assembly 200 in the first direction and may face each other (see FIGS. 1 to 4).

The second regions R2 of the extensions 114 and 124 of the first case unit 110 and the second case unit 120 may be adjacent to the end portion of the other side (e.g., the right side) in the second direction at the end portion of the other side of the electrode assembly 200 in the first direction and may face each other (see FIGS. 1 to 4).

The first regions R1 will be described with reference to FIGS. 5 and 6. The second regions R2 may be inferred from the first regions R1.

Referring to FIG. 5, when the electrode assembly 200 is positioned on the accommodation portion 112 of the first case unit 110 and the second case unit 120 is bent relatively with respect to the first case unit 110, the second case unit 120 may be interfered with the end portion of the other side (e.g., the front side) of the electrode assembly 200 in the first direction. For example, as shown in FIG. 5, the second case unit 120 may be caught by an interference portion F at one side (e.g., an upper side) in the third direction of the end portion of the other side of the electrode assembly 200 in the first direction.

Accordingly, the first case unit 110 and the second case unit 120 may be spaced apart from each other in the third direction except for the end portion of the one side (e.g., the rear side) in the first direction to be bent.

In FIG. 5, the reason why the second case unit 120 is interfered with the electrode assembly 200 may be that a width of an empty space inside the accommodation portion 122 of the second case unit 120 in the first direction is small That is, in FIG. 5, in order for the second case unit 120 not to be interfered with the electrode assembly 200, the width of the empty space inside the accommodation portion 122 of the second case unit 120 in the first direction needs to greater than or equal to a value obtained by summing the width of the electrode assembly 200 in the first direction and an extra minimum demand width in the first direction in which the second case unit 120 is not caught by the interference portion F of the electrode assembly 200 when the second case unit 120 is bent.

Here, the width of the empty space inside the accommodation portion 122 of the second case unit 120 in the first direction and the extra minimum demand width in the first direction may be a width in the first direction in a state in which the second case unit 120 is bent to fully cover the first case unit 110 as shown in FIGS. 2 to 4 or is disposed side by side with the first case unit 110 in the first direction as shown in FIG. 1.

However, when the size of the empty space inside the accommodation portion 122 of the second case unit 120 is increased to secure the extra minimum demand width, the electrode assembly 200 accommodated inside the pouch-type battery case 100 is not fixed, resulting in damage to the pouch-type secondary battery 10, and the size of the pouch-type battery case 100 may increase, resulting in a reduction in the energy density. Accordingly, it may be preferable to reduce the size of the empty space inside the accommodation portion 122 of the second case unit 120 without securing the extra minimum demand width even when the second case unit 120 is interfered with the electrode assembly 200 when the second case unit 120 is bent. Accordingly, there is a need for a method in which even when sealing (bonding) is performed in a state in which the second case unit 120 is interfered with the electrode assembly 200 and thus the first case unit 110 and the second case unit 120 are partially spaced apart from each other in the third direction, predetermined portions of the first case unit 110 are correctly bonded to corresponding predetermined portions of the second case unit 120 to reduce the wrinkles generated on the pouch-type battery case 100.

Meanwhile, when the width of the electrode assembly 200 in the third direction is increased to increase the energy density of the pouch-type secondary battery 10, the extra minimum demand width may also increase. This is because as the width of the electrode assembly 200 in the third direction increases, a distance from the end portion of the one side (e.g., the rear side) of the second case unit 120 in the first direction to be bent to the interference portion F of the electrode assembly 200 increases, and thus only when the extra minimum demand width also increases as the width of the electrode assembly 200 in the third direction increases, the second case unit 120 may not be interfered with the interference portion F of the electrode assembly 200 when the second case unit 120 is bent.

As described above, when the width of the electrode assembly 200 in the third direction is increased to increase the energy density of the pouch-type secondary battery 10, the extra minimum demand width increases, and thus when the size of the empty space inside the accommodation portion 122 of the second case unit 120 is increased to secure the increased extra minimum demand width, there occurs the above-described problem that the pouch-type secondary battery 10 is damaged and the energy density is reduced. Accordingly, it may be preferable to reduce the size of the empty space inside the accommodation portion 122 of the second case unit 120 without securing the increased extra minimum demand width increased to increase the energy density of the pouch-type secondary battery 10 even when the second case unit 120 is interfered with the electrode assembly 200 when the second case unit 120 is bent. Accordingly, as described above, there is a need for the method in which even when sealing (bonding) is performed in the state in which the second case unit 120 is interfered with the electrode assembly 200 and thus the first case unit 110 and the second case unit 120 are partially spaced apart from each other in the third direction, predetermined portions of the first case unit 110 may be correctly bonded to corresponding predetermined portions of the second case unit 120 to reduce the wrinkles generated on the pouch-type battery case 100.

Referring to FIG. 6, when arbitrary regions of the extensions 114 and 124 of the first case unit 110 and the second case unit 120, which are positioned at the other side of the first regions R1 in the first direction, are preliminarily bonded by a hot press P without preliminarily bonding the first regions R1 of the extensions 114 and 124 of the first case unit 110 and the second case unit 120 in the state in which the second case unit 120 is interfered with the end portion of the other side (e.g., the front side) of the electrode assembly 200 in the first direction as shown in FIG. 5, the first case unit 110 and the second case unit 120 are fixed in the state in which predetermined portions corresponding to each other not correctly face each other in the third direction. Accordingly, when the seventh regions R7 of the first case unit 110 and the second case unit 120, which will be described below, are bonded, the predetermined portions of the first case unit 110 are not correctly bonded to the corresponding predetermined portions of the second case unit 120, thereby generating the wrinkles on the pouch-type battery case 100.

On the other hand, unlike FIG. 6, when the first regions R1 of the extensions 114 and 124 of the first case unit 110 and the second case unit 120 are preliminarily bonded by the hot press P (see FIG. 6) in the state of FIG. 5 in which the second case unit 120 is interfered with the end portion of the other side (e.g., the front side) of the electrode assembly 200 in the first direction, as the first regions R1 of the extension 124 of the second case unit 120 and a portion of the accommodation portion 122 of the second case unit 120, which is adjacent to the first region R1 and interfered with the interference portion F of the electrode assembly 200, are pressurized by the hot press P, the first case unit 110 and the second case unit 120 may be fixed in the state in which predetermined portions corresponding to each other face each other in the third direction, for example, as shown in FIG. 3. Thereafter, when the seventh regions R7 of the first case unit 110 and the second case unit 120, which will be described below, are bonded, the predetermined portions of the first case unit 110 may be correctly bonded to the corresponding predetermined portions of the second case unit 120, for example, as shown in FIG. 3. Accordingly, wrinkles may not be generated on the pouch-type battery case 100.

Meanwhile, unlike FIGS. 5 and 6, the electrode assembly 200 may be positioned on the accommodation portion 122 of the second case unit 120, and the first case unit 110 may be bent relatively with respect to the second case unit 120, and thus the first case unit 110 may also be interfered with the end portion of the other side of the electrode assembly 200 in the first direction.

In addition, the case in which the first case unit 110 or the second case unit 120 is interfered with the end portion of the other side of the electrode assembly 200 in the first direction is not limited to the above-described embodiments. For example, the first case unit 110 or the second case unit 120 may be interfered with the end portion of the other side of the electrode assembly 200 in the first direction due to a design tolerance, an assembly tolerance, an increase in the width of the electrode assembly 200 in the first direction, or the like, and thus the first case unit 110 and the second case unit 120 may be partially spaced apart from each other in the third direction. In addition, for example, even when the accommodation portion 112 or 122 of the first case unit 110 or the second case unit 120 has a flat shape rather than the concave shape, the first case unit 110 or the second case unit 120 may be interfered with the end portion of the other side of the electrode assembly 200 in the first direction, and thus the first case unit 110 and the second case unit 120 may also be partially spaced apart from each other in the third direction.

As described above, the first sealing regions SR1 may include the first regions R1 of the first case unit 110 and the second case unit 120 or the second regions R2 of the first case unit 110 and the second case unit 120.

Accordingly, when the electrode assembly 200 is positioned on the accommodation portion 112 or 122 of the first case unit 110 or the second case unit 120 and the second case unit 120 or the first case unit 110 is bent to cover the first case unit 110 or the second case unit 120, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first regions R1 or the second regions R2 of the first case unit 110 and the second case unit 120 are preliminarily bonded. Accordingly, the first case unit 110 and the second case unit 120 may be fixed in the state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120.

In particular, even when the second case unit 120 or the first case unit 110 is interfered with the end portion of the other side of the electrode assembly 200 in the first direction when the size of the electrode assembly 200 is increased to increase the energy density of the pouch-type secondary battery 10 and the second case unit 120 or the first case unit 110 is bent to cover the first case unit 110 or the second case unit 120, the predetermined portions of the first case unit 110 may be correctly bonded to the corresponding predetermined portions of the second case unit 120.

Accordingly, it is possible to easily prevent or reduce the wrinkles generated on the pouch-type battery case 100 at low cost with the simple configuration. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

At this time, the accommodation portion 122 of the second case unit 120 may have the concave shape to accommodate at least a part of the electrode assembly 200 as described above (see FIGS. 1, 3, and 4).

When the accommodation portion 122 of the second case unit 120 has the concave shape, the second case unit 120 may be more easily interfered with the end portion of the other side of the electrode assembly 200 in the first direction than the case in which the accommodation portion 122 of the second case unit 120 is flat when the electrode assembly 200 is positioned on the accommodation portion 112 of the first case unit 110 and the second case unit 120 is bent relatively to cover the first case unit 110 as shown in FIG. 5.

In particular, when the accommodation portion 122 of the second case unit 120 has the concave shape as shown in FIG. 5, the second case unit 120 may not be interfered with the end portion of the other side of the electrode assembly 200 in the first direction only when the size of the empty space inside the accommodation portion 122 of the second case unit 120 also increases when the size (e.g., the width in the third direction) of the electrode assembly 200 is increased to increase the energy density of the pouch-type secondary battery 10. That is, when the accommodation portion 122 of the second case unit 120 has the concave shape and the size of the empty space inside the accommodation portion 122 of the second case unit 120 is the same, the accommodation portion 122 of the second case unit 120 may be more easily interfered with the end portion of the other side of the electrode assembly in the first direction as the size (e.g., the width in the third direction) of the electrode assembly 200 is increased to increase the energy density of the pouch-type secondary battery 10.

As described above, since the first regions R1 or the second regions R2 of the first case unit 110 and the second case unit 120 are preliminarily bonded first even when the accommodation portion 122 of the second case unit 120 has the concave shape and thus the second case unit 120 is easily interfered with the end portion of the other side of the electrode assembly 200 in the first direction, the first case unit 110 and the second case unit 120 may be fixed in the state in which the predetermined portions corresponding to each other correctly face each other in the third direction. Then, when the seventh regions R7 or the eighth regions R8 are bonded, predetermined portions of the first case unit 110 may be correctly bonded to corresponding predetermined portions of the second case unit 120.

Accordingly, the conventional pouch-type battery case 100 in which the accommodation portion 122 of the second case unit 120 has the concave shape to accommodate at least a part of the electrode assembly 200 may be used as it is. In addition, the conventional manufacturing apparatus for manufacturing the secondary battery 10 using the conventional pouch-type battery case 100 in which the accommodation portion 122 of the second case unit 120 has the concave shape may be used as it is.

In addition, even when the accommodation portion 122 of the second case unit 120 has the concave shape as in the related art in order to accommodate at least a part of the electrode assembly 200 and the second case unit 120 is easily interfered with the end portion of the other side of the electrode assembly 200 in the first direction when the second case unit 120 is relatively bent to cover the first case unit 110 on which the electrode assembly 200 is disposed, predetermined portions of the first case unit 110 may be correctly bonded to corresponding predetermined portions of the second case unit 120.

In particular, even when the accommodation portion 122 of the second case unit 120 has the concave shape and the size (e.g., the width in the third direction) of the electrode assembly 200 is increased to increase the energy density of the pouch-type secondary battery 10 and the second case unit 120 is easily interfered with the end portion of the other side of the electrode assembly 200 in the first direction when the second case unit 120 is relatively bent to cover the first case unit 110 on which the electrode assembly 200 is disposed, predetermined portions of the first case unit 110 may be correctly bonded to corresponding predetermined portions of the second case unit 120.

The first sealing regions SR1 of the first case unit 110 and the second case unit 120 may include the first regions R1 and the second regions R2 of the first case unit 110 and the second case unit 120.

Accordingly, since the first regions R1 of the first case unit 110 and the second case unit 120, which are adjacent to the end portion of the one side in the second direction at the end portion of the other side (e.g., the front side) of the electrode assembly 200 in the first direction, and the second regions R2 of the first case unit 110 and the second case unit 120, which are adjacent to the end portion of the other side in the second direction at the end portion of the other side (e.g., the front side) of the electrode assembly 200 in the first direction, are preliminarily bonded first, the first case unit 110 and the second case unit 120 may be fixed in the state in which predetermined portions corresponding to each other correctly face each other in the third direction. Then, when the seventh regions R7 and the eighth regions R8 are bonded, the predetermined portions of the first case unit 110 may be correctly bonded to the corresponding predetermined portions of the second case unit 120.

Accordingly, it is possible to easily prevent or reduce the wrinkles generated on the pouch-type battery case 100 at low cost with the simple configuration. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

The lengths of the first regions R1 of the first case unit 110 and the second case unit 120 in the first direction may each be smaller than the length of the electrode assembly 200 in the first direction or the lengths of the second regions R2 of the first case unit 110 and the second case unit 120 in the first direction may each be smaller than the length of the electrode assembly 200 in the first direction.

Accordingly, it is possible to accurately, preliminarily, and correctly bond the first regions R1 or the second regions R2 of the first case unit 110 and the second case unit 120 with the simple configuration.

The other end (e.g., the front end) in the first direction of the end portion of the one side (e.g., the left side) in the second direction at the end portion of the other side (e.g., front side) of the electrode assembly (200) in the first direction may be positioned between one end (e.g., rear end) and the other end (e.g., the front end) in the first direction of each of the first regions (R1) of the first case unit (110) and the second case unit (120).

That is, in the first regions R1 of the first case unit 110 and the second case unit 120, the one end (e.g., the rear end) of each of the first regions R1 in the first direction may be positioned at the one side in the first direction of the other end in the first direction of the end portion of the one side in the second direction at the end portion of the other side of the electrode assembly 200 in the first direction, and the other end (e.g., the front end) of each of the first regions R1 in the first direction may be positioned at the other side in the first direction of the other end in the first direction of the end portion of the one side in the second direction at the end portion of the other side of the electrode assembly 200 in the first direction.

For example, the one end (e.g., the rear end) of each of the first regions R1 in the first direction may be positioned at the one side (e.g., the rear side) of the third corner C3 of the electrode assembly 200 in the first direction, and the other end (e.g., the front end) of each of the first regions R1 in the first direction may be positioned at the other side of the third corner C3 of the electrode assembly 200 in the first direction (see FIG. 2).

Accordingly, the first regions R1 of the first case unit 110 and the second case unit 120 may be preliminarily and correctly bonded by applying a sufficient external force to the predetermined portion of the first case unit 110 or the second case unit 120 interfered with the end portion of the other side (e.g., the front side) of the electrode assembly 200 in the first direction. Accordingly, the first case unit 110 and the second case unit 120 may be fixed in the state in which predetermined portions corresponding to each other correctly face each other in the third direction, and then when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

The other end (e.g., the front end) in the first direction of the end portion of the other side (e.g., the right side) in the second direction at the end portion of the other side (e.g., front side) of the electrode assembly (200) in the first direction may be positioned between one end (e.g., rear end) and the other end (e.g., the front end) in the first direction of each of the second regions (R2) of the first case unit (110) and the second case unit (120).

That is, in the second regions R2 of the first case unit 110 and the second case unit 120, the one end of each of the second regions R2 in the first direction may be positioned at the one side in the first direction of the other end in the first direction of the end portion of the other side in the second direction at the end portion of the other side of the electrode assembly 200 in the first direction, and the other end of each of the second regions R2 in the first direction may be positioned at the other side in the first direction of the other end in the first direction of the end portion of the other side in the second direction at the end portion of the other side of the electrode assembly 200 in the first direction.

For example, the one end (e.g., the rear end) of each of the second regions R2 in the first direction may be positioned at the one side (e.g., the rear side) of the fourth corner C4 of the electrode assembly 200 in the first direction, and the other end (e.g., the front end) of each of the first regions R1 in the first direction may be positioned at the other side of the fourth corner C4 of the electrode assembly 200 in the first direction (see FIG. 2).

Accordingly, the second regions R2 of the first case unit 110 and the second case unit 120 may be preliminarily and correctly bonded by applying a sufficient external force to the predetermined portion of the first case unit 110 or the second case unit 120 interfered with the end portion of the other side (e.g., the front side) of the electrode assembly 200 in the first direction. Accordingly, the first case unit 110 and the second case unit 120 may be fixed in the state in which predetermined portions corresponding to each other correctly face each other in the third direction, and then when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

The first regions R1 of the first case unit 110 and the second case unit 120 may be positioned at the one side of the electrode assembly 200 in the second direction or the second regions R2 of the first case unit 110 and the second case unit 120 may be positioned at the other side of the electrode assembly 200 in the second direction.

Accordingly, it is possible to accurately and correctly bond the first regions R1 or the second regions R2 of the first case unit 110 and the second case unit 120 with the simple configuration.

As described above, when the electrode assembly 200 has the quadrangular cross section extending in the first direction and the second direction and thus includes the first corner C1, the second corner C2, the third corner C3, and the fourth corner C4, the first regions R1 may be adjacent to the third corner C3, and the second regions R2 may be adjacent to the fourth corner C4.

Accordingly, when the electrode assembly 200 has the quadrangular cross section extending in the first direction and the second direction and includes the four corners C1, C2, C3, and C4, since the first regions R1 or the second regions R2 of the first case unit 110 and the second case unit 120, which are adjacent to the third corner C3 or the fourth corner C4 at the other side of the electrode assembly 200 in the first direction, are preliminarily bonded first, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first case unit 110 and the second case unit 120 may be fixed in the state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

The first sealing regions SR1 may further include the third regions R3, the fifth regions R5, the fourth regions R4, or the sixth regions R6 of the extensions 114 and 124 of the first case unit 110 and the second case unit 120.

The third regions R3 of the extensions 114 and 124 of the first case unit 110 and the second case unit 120 may be positioned at the one side of the first regions R1 of the first case unit 110 and the second case unit 120 in the first direction and may face each other.

The fifth regions R5 of the extensions 114 and 124 of the first case unit 110 and the second case unit 120 may be positioned at the other side of the first regions R1 of the first case unit 110 and the second case unit 120 in the first direction and may face each other.

The fourth regions R4 of the extensions 114 and 124 of the first case unit 110 and the second case unit 120 may be positioned at the one side of the second regions R2 of the first case unit 110 and the second case unit 120 in the first direction and may face each other.

The sixth regions R6 of the extensions 114 and 124 of the first case unit 110 and the second case unit 120 may be positioned at the other side of the second regions R2 of the first case unit 110 and the second case unit 120 in the first direction and may face each other.

Accordingly, since the third regions R3, the fifth regions R5, the fourth regions R4, or the sixth regions R6 of the first case unit 110 and the second case unit 120 as well as the first regions R1 or the second regions R2 of the first case unit 110 and the second case unit 120 are preliminarily bonded first, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first case unit 110 and the second case unit 120 may be fixed in the state in which predetermined portions corresponding to each other face each other in the third direction. Then, when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

The second sealing regions SR2 may be bonded after the first sealing regions SR1 are bonded. The second sealing regions SR2 may be, for example, regions of the extensions 114 and 124 of the first case unit 110 and the second case unit 120 bonded in the main sealing process performed after the pre-sealing process.

The second sealing regions SR2 may include the seventh regions R7 of the extensions 114 and 124 of the first case unit 110 and the second case unit 120 or include the eighth regions R8 of the extensions 114 and 124 of the first case unit 110 and the second case unit 120.

The seventh regions R7 of the extensions 114 and 124 of the first case unit 110 and the second case unit 120 may be positioned at one side of the electrode assembly 200 in the second direction and may face each other. The seventh regions R7 may have a greater total length in the first direction than the first regions R1.

The eighth regions R8 of the extensions 114 and 124 of the first case unit 110 and the second case unit 120 may be positioned at the other side of the electrode assembly 200 in the second direction and may face each other. The eighth regions R8 may have a greater total length in the first direction than the second regions R2.

The second sealing regions SR2 may include the seventh regions R7 and the eighth regions R8 of the first case unit 110 and the second case unit 120.

The first regions R1 of the first case unit 110 and the second case unit 120 included in the first sealing regions SR1 may be included in the seventh regions R7 of the first case unit 110 and the second case unit 120 included in the second sealing regions SR2 or the second regions R2 of the first case unit 110 and the second case unit 120 included in the first sealing regions SR1 may be included in the eighth regions R8 of the first case unit 110 and the second case unit 120 included in the second sealing regions SR2.

Accordingly, it is possible to prevent or reduce the wrinkles generated on the pouch-type battery case 100. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

FIG. 7 is a flowchart of a method of sealing the pouch-type battery case according to one embodiment of the present disclosure.

Referring to FIG. 7, the method of sealing the pouch-type battery case according to one embodiment may include a bending operation, a first sealing operation, and a second sealing operation. The pouch-type battery case 100 and the electrode assembly 200 used in each operation are as described above. Hereinafter, each operation will be described.

In the bending operation, the electrode assembly 200 may be positioned on the accommodation portion 112 or 122 of the first case unit 110 or the second case unit 120 and the end portion of the second case unit 120 in the first direction connected to the first case unit 110 may be bent relatively with respect to the first case unit 110 so that the first case unit 110 and the second case unit 120 face each other in the third direction. Accordingly, the electrode assembly 200 may be disposed between the accommodation portions 112 and 122 of the first case unit 110 and the second case unit 120.

In addition, when the accommodation portion 122 of the second case unit 120 has the concave shape to accommodate at least a part of the electrode assembly 200 as described above, the electrode assembly 200 may be positioned on the accommodation portion 112 of the first case unit 110 and the end portion of the second case unit 120 in the first direction connected to the first case unit 110 may be bent relatively with respect to the first case unit 110 to accommodate at least a part of the electrode assembly 200 in the accommodation portion 122 of the second case unit 120.

Accordingly, the conventional pouch-type battery case 100 in which the accommodation portion 122 of the second case unit 120 has the concave shape to accommodate at least a part of the electrode assembly 200 may be used as it is. In addition, the conventional manufacturing apparatus for manufacturing the secondary battery 10 using the conventional pouch-type battery case 100 in which the accommodation portion 122 of the second case unit 120 has the concave shape may be used as it is.

In addition, even when the accommodation portion 122 of the second case unit 120 has the concave shape as in the related art in order to accommodate at least a part of the electrode assembly 200 and the second case unit 120 is easily interfered with the end portion of the other side of the electrode assembly 200 in the first direction when the second case unit 120 is relatively bent to cover the first case unit 110 on which the electrode assembly 200 is disposed, predetermined portions of the first case unit 110 may be correctly bonded to corresponding predetermined portions of the second case unit 120 by the first sealing operation and the second sealing operation, which will be described below.

In particular, even when the accommodation portion 122 of the second case unit 120 has the concave shape and the size (e.g., the width in the third direction) of the electrode assembly 200 is increased to increase the energy density of the pouch-type secondary battery 10 and the second case unit 120 is easily interfered with the end portion of the other side of the electrode assembly 200 in the first direction when the second case unit 120 is relatively bent to cover the first case unit 110 on which the electrode assembly 200 is disposed, predetermined portions of the first case unit 110 may be correctly bonded to corresponding predetermined portions of the second case unit 120 by the first sealing operation and the second sealing operation, which will be described below.

The first sealing operation may be performed after the bending operation. The first sealing operation may be the pre-sealing process preliminarily performed before the main sealing process is performed.

In the first sealing operation, the first regions R1 of the extensions 114 and 124 of the first case unit 110 and the second case unit 120, which are adjacent to the end portion of one side in the second direction at the end portion of the other side of the electrode assembly 200 in the first direction and face each other, may be bonded, or the second regions R2 of the extensions 114 and 124 of the first case unit 110 and the second case unit 120, which are adjacent to the end portion of the other side in the second direction at the end portion of the other side of the electrode assembly 200 in the first direction and face each other, may be bonded.

Accordingly, when the electrode assembly 200 is positioned on the accommodation portion 112 or 122 of the first case unit 110 or the second case unit 120 and the second case unit 120 or the first case unit 110 is bent to cover the first case unit 110 or the second case unit 120, even when the second case unit 120 or the first case unit 110 is interfered with the end portion of the other side (e.g., the front side) of the electrode assembly 200 in the first direction and thus even when the first case unit 110 and the second case unit 120 are partially spaced apart from each other in the third direction, the first regions R1 or the second regions R2 of the first case unit 110 and the second case unit 120 are preliminarily bonded first. Accordingly, the first case unit 110 and the second case unit 120 may be fixed in the state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120.

In particular, when the size of the electrode assembly 200 is increased to increase an energy density of the pouch-type secondary battery 10 and the second case unit 120 or the first case unit 110 is bent to cover the first case unit 110 or the second case unit 120, even when the second case unit 120 or the first case unit 110 is interfered with the end portion of the other side of the electrode assembly 200 in the first direction, predetermined portions of the first case unit 110 may be correctly bonded to corresponding predetermined portions of the second case unit 120.

Accordingly, it is possible to easily prevent or reduce the wrinkles generated on the pouch-type battery case 100 at low cost with the simple configuration. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

In addition, the first regions R1 of the first case unit 110 and the second case unit 120 facing each other may be bonded, and the second regions R2 of the first case unit 110 and the second case unit 120 facing each other may be bonded.

Accordingly, since the first regions R1 of the first case unit 110 and the second case unit 120, which are adjacent to the end portion of the one side in the second direction at the end portion of the other side (e.g., the front side) of the electrode assembly 200 in the first direction, and the second regions R2 of the first case unit 110 and the second case unit 120, which are adjacent to the end portion of the other side in the second direction at the end portion of the other side (e.g., the front side) of the electrode assembly 200 in the first direction, are preliminarily bonded first, the first case unit 110 and the second case unit 120 may be fixed in the state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120.

Accordingly, it is possible to easily prevent or reduce the wrinkles generated on the pouch-type battery case 100 at low cost with the simple configuration. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

Here, the lengths of the first regions R1 of the first case unit 110 and the second case unit 120 in the first direction or the lengths of the second regions R2 of the first case unit 110 and the second case unit 120 in the first direction may each be smaller than the length of the electrode assembly in the first direction.

Accordingly, it is possible to accurately, preliminarily, and correctly bond the first regions R1 or the second regions R2 of the first case unit 110 and the second case unit 120 with the simple configuration.

Here, the other end in the first direction of the end portion of the one side in the second direction at the end portion of the other side of the electrode assembly (200) in the first direction may be positioned between one end and the other end in the first direction of each of the first regions (R1) of the first case unit (110) and the second case unit (120) bonded in the first sealing operation.

That is, in the first regions R1 of the first case unit 110 and the second case unit 120, the one end of each of the first regions R1 in the first direction may be positioned at the one side in the first direction of the other end in the first direction of the end portion of the one side in the second direction at the end portion of the other side of the electrode assembly 200 in the first direction, and the other end of each of the first regions R1 in the first direction may be positioned at the other side in the first direction of the other end in the first direction of the end portion of the one side in the second direction at the end portion of the other side of the electrode assembly 200 in the first direction.

Accordingly, the first regions R1 of the first case unit 110 and the second case unit 120 may be preliminarily and correctly bonded by applying a sufficient external force to the predetermined portion of the first case unit 110 or the second case unit 120 interfered with the end portion of the other side (e.g., the front side) of the electrode assembly 200 in the first direction. Accordingly, the first case unit 110 and the second case unit 120 may be fixed in the state in which predetermined portions corresponding to each other correctly face each other in the third direction, and then when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

Here, the other end in the first direction of the end portion of the other side in the second direction at the end portion of the other side of the electrode assembly (200) in the first direction may be positioned between one end and the other end in the first direction of each of the second regions (R2) of the first case unit (110) and the second case unit (120) bonded in the first sealing operation.

That is, in the second regions R2 of the first case unit 110 and the second case unit 120, the one end of each of the second regions R2 in the first direction may be positioned at the one side in the first direction of the other end in the first direction of the end portion of the other side in the second direction at the end portion of the other side of the electrode assembly 200 in the first direction, and the other end of each of the second regions R2 in the first direction may be positioned at the other side in the first direction of the other end in the first direction of the end portion of the other side in the second direction at the end portion of the other side of the electrode assembly 200 in the first direction.

Accordingly, the second regions R2 of the first case unit 110 and the second case unit 120 may be preliminarily and correctly bonded by applying a sufficient external force to the predetermined portion of the first case unit 110 or the second case unit 120 interfered with the end portion of the other side (e.g., the front side) of the electrode assembly 200 in the first direction. Accordingly, the first case unit 110 and the second case unit 120 may be fixed in the state in which predetermined portions corresponding to each other correctly face each other in the third direction, and then when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

Here, the first regions R1 of the first case unit 110 and the second case unit 120 may be positioned at the one side of the electrode assembly 200 in the second direction or the second regions R2 of the first case unit 110 and the second case unit 120 may be positioned at the other side of the electrode assembly 200 in the second direction.

Accordingly, it is possible to accurately and correctly bond the first regions R1 or the second regions R2 of the first case unit 110 and the second case unit 120 with the simple configuration.

Here, the first regions R1 of the first case unit 110 and the second case unit 120 may be included in the seventh regions R7 of the first case unit 110 and the second case unit 120 bonded in the second sealing operation to be described below, or the second regions R2 of the first case unit 110 and the second case unit 120 may be included in the eighth regions R8 of the first case unit 110 and the second case unit 120 bonded in the second sealing operation to be described below.

Accordingly, it is possible to prevent or reduce wrinkles generated on the pouch-type battery case 100. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

Here, when the electrode assembly 200 has the quadrangular cross section extending in the first direction and the second direction and thus includes the first corner C1 positioned at the one side in the first direction and the one side in the second direction, the second corner C2 positioned at the one side in the first direction and the other side in the second direction, the third corner C3 positioned at the other side in the first direction and the one side in the second direction, and the fourth corner C4 positioned at the other side in the first direction and the other side in the second direction, the first regions R1 may be adjacent to the third corner C3, and the second regions R2 may be adjacent to the fourth corner C4.

Accordingly, when the electrode assembly 200 has the quadrangular cross section extending in the first direction and the second direction and includes the four corners C1, C2, C3, and C4, since the first regions R1 or the second regions R2 of the first case unit 110 and the second case unit 120, which are adjacent to the third corner C3 or the fourth corner C4 at the other side of the electrode assembly 200 in the first direction, are preliminarily bonded first, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first case unit 110 and the second case unit 120 may be fixed in the state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

In addition, the third regions R3 of the extensions 114 and 124 of the first case unit 110 and the second case unit 120, which are positioned at the one side of the first regions R1 of the first case unit 110 and the second case unit 120 in the first direction and face each other, may be further bonded, the fifth regions R5 of the extensions 114 and 124 of the first case unit 110 and the second case unit 120, which are positioned at the other side of the first regions R1 of the first case unit 110 and the second case unit 120 in the first direction and face each other, may be further bonded, the fourth regions R4 of the extensions 114 and 124 of the first case unit 110 and the second case unit 120, which are positioned at the one side of the second regions R2 of the first case unit 110 and the second case unit 120 in the first direction and face each other, may be further bonded, or the sixth regions R6 of the extensions 114 and 124 of the first case unit 110 and the second case unit 120, which are positioned at the other side of the second regions R2 of the first case unit 110 and the second case unit 120 in the first direction and face each other, may be further bonded.

Accordingly, since the third regions R3, the fifth regions R5, the fourth regions R4, or the sixth regions R6 of the first case unit 110 and the second case unit 120 as well as the first regions R1 or the second regions R2 of the first case unit 110 and the second case unit 120 are preliminarily bonded first, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first case unit 110 and the second case unit 120 may be fixed in the state in which predetermined portions corresponding to each other face each other in the third direction. Then, when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

The second sealing operation may be performed after the first sealing operation. The second sealing operation may be the main sealing process performed after the pre-sealing process.

In the second sealing operation, the seventh regions R7 of the extensions 114 and 124 of the first case unit 110 and the second case unit 120, which are positioned at the one side of the electrode assembly 200 in the second direction and face each other, may be bonded, or the eighth regions R8 of the extensions 114 and 124 of the first case unit 110 and the second case unit 120, which are positioned at the other side of the electrode assembly 200 in the second direction and face each other, may be bonded.

In addition, the seventh regions R7 of the first case unit 110 and the second case unit 120 facing each other may be bonded, and the eighth regions R8 of the first case unit 110 and the second case unit 120 facing each other may be bonded.

According to embodiments of the present disclosure, a method of sealing the pouch-type battery case 100 including the first case unit 110 and a second case unit 120 with an electrode assembly 200 accommodated between the first case unit 110 and the second case unit 120, wherein the first case unit 110 extends in the first direction and the second direction intersecting the first direction, and the second case unit 120 has the end portion in the first direction connected to the end portion of the one side of the first case unit 110 in the first direction and is bent relatively with respect to the first case unit 110 to cover the first case unit 110 may include the bending operation, the first sealing operation, and the second sealing operation. Each of the first case unit 110 and the second case unit 120 may include the accommodation portion 112 or 122 in contact with or facing the electrode assembly 200 and the extension 114 or 124 that extends outward from the accommodation portion 112 or 122, at least partially surrounds the accommodation portion 112 or 122, and is bondable. In the bending operation, the electrode assembly 200 may be positioned on the accommodation portion 112 or 122 of the first case unit 110 or the second case unit 120, and the end portion of the second case unit 120 in the first direction connected to the first case unit 110 may be bent relatively with respect to the first case unit 110 so that the first case unit 110 and the second case unit 120 face each other in the third direction intersecting the first direction and the second direction, and thus the electrode assembly 200 may be disposed between the accommodation portions 112 and 122 of the first case unit 110 and the second case unit 120. The first sealing operation may be performed after the bending operation. In the first sealing operation, the first regions R1 of the extensions 114 and 124 of the first case unit 110 and the second case unit 120, which are adjacent to the end portion of the one side in the second direction at the end portion of the other side of the electrode assembly 200 in the first direction and face each other, may be bonded, or the second regions R2 of the extensions 114 and 124 of the first case unit 110 and the second case unit 120, which are adjacent to the end portion of the other side in the second direction at the end portion of the other side of the electrode assembly 200 in the first direction and face each other, may be bonded. The second sealing operation may be performed after the first sealing operation. In the second sealing operation, the seventh regions R7 of the extensions 114 and 124 of the first case unit 110 and the second case unit 120, which are positioned at the one side of the electrode assembly 200 in the second direction and face each other, may be bonded, or the eighth regions R8 of the extensions 114 and 124 of the first case unit 110 and the second case unit 120 which are positioned at the other side of the electrode assembly 200 in the second direction and face each other, may be bonded.

Accordingly, when the electrode assembly 200 is positioned on the accommodation portion 112 or 122 of the first case unit 110 or the second case unit 120 and the second case unit 120 or the first case unit 110 is bent to cover the first case unit 110 or the second case unit 120, even when the second case unit 120 or the first case unit 110 is interfered with the end portion of the other side (e.g., a front side) of the electrode assembly 200 in the first direction and thus the first case unit 110 and the second case unit 120 are partially spaced apart from each other in the third direction, the first regions R1 or the second regions R2 of the first case unit 110 and the second case unit 120 are preliminarily bonded first. Accordingly, the first case unit 110 and the second case unit 120 may be fixed in a state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120.

In particular, the size of the electrode assembly 200 is increased to increase an energy density of the pouch-type secondary battery 10, and thus even when the second case unit 120 or the first case unit 110 is interfered with the end portion of the other side of the electrode assembly 200 in the first direction when the second case unit 120 or the first case unit 110 is bent to cover the first case unit 110 or the second case unit 120, predetermined portions of the first case unit 110 may be correctly bonded to corresponding predetermined portions of the second case unit 120.

Accordingly, it is possible to easily prevent or reduce wrinkles generated on the pouch-type battery case 100 at low cost with the simple configuration. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

According to the embodiments of the present disclosure, the accommodation portion 122 of the second case unit 120 may have a concave shape to accommodate at least a part of the electrode assembly 200. In the bending operation, the electrode assembly 200 may be positioned on the accommodation portion 112 of the first case unit 110, and the end portion of the second case unit 120 in the first direction connected to the first case unit 110 may be bent relatively with respect to the first case unit 110 to accommodate at least a part of the electrode assembly 200 in the accommodation portion 122 of the second case unit 120.

Accordingly, the conventional pouch-type battery case 100 in which the accommodation portion 122 of the second case unit 120 has the concave shape to accommodate at least a part of the electrode assembly 200 may be used as it is. In addition, the conventional manufacturing apparatus for manufacturing the secondary battery 10 using the conventional pouch-type battery case 100 in which the accommodation portion 122 of the second case unit 120 has the concave shape may be used as it is.

In addition, even when the accommodation portion 122 of the second case unit 120 has the concave shape as in the related art in order to accommodate at least a part of the electrode assembly 200 and the second case unit 120 is easily interfered with the end portion of the other side of the electrode assembly 200 in the first direction when the second case unit 120 is relatively bent to cover the first case unit 110 on which the electrode assembly 200 is disposed, predetermined portions of the first case unit 110 may be correctly bonded to corresponding predetermined portions of the second case unit 120 by the first sealing operation and the second sealing operation.

In particular, even when the accommodation portion 122 of the second case unit 120 has the concave shape and the size (e.g., a width in the third direction) of the electrode assembly 200 is increased to increase the energy density of the pouch-type secondary battery 10 and the second case unit 120 is easily interfered with the end portion of the other side of the electrode assembly 200 in the first direction when the second case unit 120 is relatively bent to cover the first case unit 110 on which the electrode assembly 200 is disposed, predetermined portions of the first case unit 110 may be correctly bonded to corresponding predetermined portions of the second case unit 120 by the first sealing operation and the second sealing operation.

According to the embodiments of the present disclosure, in the first sealing operation, the first regions R1 of the first case unit 110 and the second case unit 120 facing each other may be bonded, and the second regions R2 of the first case unit 110 and the second case unit 120 facing each other may be bonded. In the second sealing operation, the seventh regions R7 of the first case unit 110 and the second case unit 120 facing each other may be bonded, and the eighth regions R8 of the first case unit 110 and the second case unit 120 facing each other may be bonded.

Accordingly, since the first regions R1 of the first case unit 110 and the second case unit 120, which are adjacent to the end portion of the one side in the second direction at the end portion of the other side (e.g., the front side) of the electrode assembly 200 in the first direction, and the second regions R2 of the first case unit 110 and the second case unit 120 which are adjacent to the end portion of the other side in the second direction at the end portion of the other side (e.g., the front side) of the electrode assembly 200 in the first direction, are preliminarily bonded first, the first case unit 110 and the second case unit 120 may be fixed in a state in which predetermined portions corresponding to each other correctly face each other in the third direction. Then, when the seventh regions R7 and the eighth regions R8 are bonded, the predetermined portions of the first case unit 110 may be correctly bonded to the corresponding predetermined portions of the second case unit 120.

Accordingly, it is possible to easily prevent or reduce the wrinkles generated on the pouch-type battery case 100 at low cost with the simple configuration. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

According to the embodiments of the present disclosure, the lengths of the first regions R1 of the first case unit 110 and the second case unit 120 in the first direction bonded in the first sealing operation or the lengths of the second regions R2 of the first case unit 110 and the second case unit 120 in the first direction bonded in the first sealing operation may each be smaller than the length of the electrode assembly 200 in the first direction.

Accordingly, it is possible to accurately, preliminarily, and correctly bond the first regions R1 or the second regions R2 of the first case unit 110 and the second case unit 120 with the simple configuration.

According to the embodiments of the present disclosure, the other end in the first direction of the end portion of the one side in the second direction at the end portion of the other side of the electrode assembly (200) in the first direction may be positioned between one end and the other end in the first direction of each of the first regions (R1) of the first case unit (110) and the second case unit (120) bonded in the first sealing operation.

Accordingly, the first regions R1 of the first case unit 110 and the second case unit 120 may be preliminarily and correctly bonded by applying a sufficient external force to the predetermined portion of the first case unit 110 or the second case unit 120 interfered with the end portion of the other side (e.g., the front side) of the electrode assembly 200 in the first direction. Accordingly, the first case unit 110 and the second case unit 120 may be fixed in the state in which predetermined portions corresponding to each other correctly face each other in the third direction, and then when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

According to the embodiments of the present disclosure, the other end in the first direction of the end portion of the other side in the second direction at the end portion of the other side of the electrode assembly (200) in the first direction bay be positioned between one end and the other end in the first direction of each of the second regions (R2) of the first case unit (110) and the second case unit (120) bonded in the first sealing operation.

Accordingly, the second regions R2 of the first case unit 110 and the second case unit 120 may be preliminarily and correctly bonded by applying a sufficient external force to the predetermined portion of the first case unit 110 or the second case unit 120 interfered with the end portion of the other side (e.g., the front side) of the electrode assembly 200 in the first direction. Accordingly, the first case unit 110 and the second case unit 120 may be fixed in the state in which predetermined portions corresponding to each other correctly face each other in the third direction, and then when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 with low costs and the simple configuration.

According to the embodiments of the present disclosure, the first regions R1 of the first case unit 110 and the second case unit 120 bonded in the first sealing operation may be positioned at the one side of the electrode assembly 200 in the second direction, or the second regions R2 of the first case unit 110 and the second case unit 120 bonded in the first sealing operation may be positioned at the other side of the electrode assembly 200 in the second direction.

Accordingly, it is possible to accurately and correctly bond the first regions R1 or the second regions R2 of the first case unit 110 and the second case unit 120 with the simple configuration.

According to the embodiments of the present disclosure, the first regions R1 of the first case unit 110 and the second case unit 120 bonded in the first sealing operation may be included in the seventh regions R7 of the first case unit 110 and the second case unit 120 bonded in the second sealing operation, or the second regions R2 of the first case unit 110 and the second case unit 120 bonded in the first sealing operation may be included in the eighth regions R8 of the first case unit 110 and the second case unit 120 bonded in the second sealing operation.

Accordingly, it is possible to prevent or reduce the wrinkles generated on the pouch-type battery case 100. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

According to the embodiments of the present disclosure, the electrode assembly 200 may have the quadrangular cross section extending in the first direction and the second direction and thus include the first corner C1 positioned at the one side in the first direction and the one side in the second direction, the second corner C2 positioned at the one side in the first direction and the other side in the second direction, the third corner C3 positioned at the other side in the first direction and the one side in the second direction, and the fourth corner C4 positioned at the other side in the first direction and the other side in the second direction. In the first sealing operation, the first regions R1 may be adjacent to the third corner C3, and the second regions R2 may be adjacent to the fourth corner C4.

Accordingly, when the electrode assembly 200 has the quadrangular cross section extending in the first direction or the second direction and includes the four corners C1, C2, C3, and C4, since the first regions R1 or the second regions R2 of the first case unit 110 and the second case unit 120, which are adjacent to the third corner C3 or the fourth corner C4 at the other side of the electrode assembly 200 in the first direction, are preliminarily bonded first, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first case unit 110 and the second case unit 120 may be fixed in the state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

According to the embodiments of the present disclosure, in the first sealing operation, the third regions R3 of the extensions 114 and 124 of the first case unit 110 and the second case unit 120, which are positioned at the one side of the first regions R1 of the first case unit 110 and the second case unit 120 in the first direction and face each other, may be further bonded, the fifth regions R5 of the extensions 114 and 124 of the first case unit 110 and the second case unit 120 which are positioned at the other side of the first regions R1 of the first case unit 110 and the second case unit 120 in the first direction and face each other, may be further bonded, the fourth regions R4 of the extensions 114 and 124 of the first case unit 110 and the second case unit 120 which are positioned at one side of the second regions R2 of the first case unit 110 and the second case unit 120 in the first direction and face each other, may be further bonded, or the sixth regions R6 of the extensions 114 and 124 of the first case unit 110 and the second case unit 120, which are positioned at the other side of the second regions R2 of the first case unit 110 and the second case unit 120 in the first direction and face each other, may be further bonded.

Accordingly, since the third regions R3, the fifth regions R5, the fourth regions R4, or the sixth regions R6 of the first case unit 110 and the second case unit 120 as well as the first regions R1 or the second regions R2 of the first case unit 110 and the second case unit 120 are preliminarily bonded first, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first case unit 110 and the second case unit 120 may be fixed in the state in which predetermined portions corresponding to each other face each other in the third direction. Then, when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

According to the embodiments of the present disclosure, the pouch-type secondary battery may be manufactured using the method of sealing the pouch-type battery case.

Accordingly, when the electrode assembly 200 is positioned on the accommodation portion 112 or 122 of the first case unit 110 or the second case unit 120 and the second case unit 120 or the first case unit 110 is bent to cover the first case unit 110 or the second case unit 120, even when the second case unit 120 or the first case unit 110 is interfered with the end portion of the other side (e.g., the front side) of the electrode assembly 200 in the first direction and thus first the first case unit 110 and the second case unit 120 are partially spaced apart from each other in the third direction, the first regions R1 or the second regions R2 of the first case unit 110 and the second case unit 120 are preliminarily bonded. Accordingly, the first case unit 110 and the second case unit 120 may be fixed in the state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120.

In particular, the size of the electrode assembly 200 is increased to increase the energy density of the pouch-type secondary battery 10, and thus even when the second case unit 120 or the first case unit 110 is interfered with the end portion of the other side of the electrode assembly 200 in the first direction when the second case unit 120 or the first case unit 110 is bent to cover the first case unit 110 or the second case unit 120, predetermined portions of the first case unit 110 may be correctly bonded to corresponding predetermined portions of the second case unit 120.

Accordingly, it is possible to easily prevent or reduce the wrinkles generated on the pouch-type battery case 100 at low cost with the simple configuration. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

According to the embodiments of the present disclosure, the pouch-type secondary battery may include the pouch-type battery case 100 including the first case unit 110 extending in the first direction and the second direction intersecting the first direction and the second case unit 120 having the end portion in the first direction connected to the end portion of the one side of the first case unit 110 in the first direction and bent relatively with respect to the first case unit 110 to face the first case unit 110 in the third direction intersecting the first direction and the second direction, and the electrode assembly 200 accommodated between the first case unit 110 and the second case unit 120. Each of the first case unit 110 and the second case unit 120 may include the accommodation portion 112 or 122 in contact with or facing the electrode assembly 200 and the extension 114 or 124 that extends outward from the accommodation portion 112 or 122, at least partially surrounding the accommodation portion 112 or 122, and is bondable. The electrode assembly 200 may be disposed between the accommodation portions 112 and 122 of the first case unit 110 and the second case unit 120. The extensions 114 and 124 of the first case unit 110 and the second case unit 120 may include the first sealing regions SR1 which are bonded to face each other and the second sealing regions SR2 that are bonded to face each other after the first sealing regions SR1 are bonded. The first sealing regions SR1 may include the first regions R1 of the extensions 114 and 124 of the first case unit 110 and the second case unit 120, which are adjacent to the end portion of the one side in the second direction at the end portion of the other side of the electrode assembly 200 in the first direction and face each other, or the second regions R2 of the extensions 114 and 124 of the first case unit 110 and the second case unit 120 which are adjacent to the end portion of the other side in the second direction at the end portion of the other side of the electrode assembly 200 in the first direction and face each other. The second sealing regions SR2 may include the seventh regions R7 of the extensions 114 and 124 of the first case unit 110 and the second case unit 120, which are positioned at one side of the electrode assembly 200 in the second direction and face each other, or the eighth regions R8 of the extensions 114 and 124 of the first case unit 110 and the second case unit 120 which are positioned at the other side of the electrode assembly 200 in the second direction and face each other.

Accordingly, when the electrode assembly 200 is positioned on the accommodation portion 112 or 122 of the first case unit 110 or the second case unit 120 and the second case unit 120 or the first case unit 110 is bent to cover the first case unit 110 or the second case unit 120, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first regions R1 or the second regions R2 of the first case unit 110 and the second case unit 120 are preliminarily bonded first. Accordingly, the first case unit 110 and the second case unit 120 may be fixed in the state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120.

In particular, the size of the electrode assembly 200 is increased to increase the energy density of the pouch-type secondary battery 10, and thus even when the second case unit 120 or the first case unit 110 is interfered with the end portion of the other side of the electrode assembly 200 in the first direction when the second case unit 120 or the first case unit 110 is bent to cover the first case unit 110 or the second case unit 120, predetermined portions of the first case unit 110 may be correctly bonded to corresponding predetermined portions of the second case unit 120.

Accordingly, it is possible to easily prevent or reduce the wrinkles generated on the pouch-type battery case 100 at low cost with the simple configuration. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

According to the embodiments of the present disclosure, the accommodation portion 122 of the second case unit 120 may have the concave shape to accommodate at least a part of the electrode assembly 200.

Accordingly, the conventional pouch-type battery case 100 in which the accommodation portion 122 of the second case unit 120 has the concave shape to accommodate at least a part of the electrode assembly 200 may be used as it is. In addition, the conventional manufacturing apparatus for manufacturing the secondary battery 10 using the conventional pouch-type battery case 100 in which the accommodation portion 122 of the second case unit 120 has the concave shape may be used as it is.

In addition, even when the accommodation portion 122 of the second case unit 120 has the concave shape as in the related art in order to accommodate at least a part of the electrode assembly 200 and the second case unit 120 is easily interfered with the end portion of the other side of the electrode assembly 200 in the first direction when the second case unit 120 is relatively bent to cover the first case unit 110 on which the electrode assembly 200 is disposed, predetermined portions of the first case unit 110 may be correctly bonded to corresponding predetermined portions of the second case unit 120.

In particular, since the accommodation portion 122 of the second case unit 120 has the concave shape and the size (e.g., the width in the third direction) of the electrode assembly 200 is increased to increase the energy density of the pouch-type secondary battery 10, even when the second case unit 120 is easily interfered with the end portion of the other side of the electrode assembly 200 in the first direction when the second case unit 120 is relatively bent to cover the first case unit 110 on which the electrode assembly 200 is disposed, predetermined portions of the first case unit 110 may be correctly bonded to corresponding predetermined portions of the second case unit 120.

According to the embodiments of the present disclosure, the first sealing regions SR1 of the first case unit 110 and the second case unit 120 may include the first regions R1 and the second regions R2 of the first case unit 110 and the second case unit 120. The second sealing regions SR2 of the first case unit 110 and the second case unit 120 may include the seventh regions R7 and the eighth regions R8 of the first case unit 110 and the second case unit 120.

Accordingly, since the first regions R1 of the first case unit 110 and the second case unit 120, which are adjacent to the end portion of the one side in the second direction at the end portion of the other side (e.g., the front side) of the electrode assembly 200 in the first direction, and the second regions R2 of the first case unit 110 and the second case unit 120 which are adjacent to the end portion of the other side in the second direction at the end portion of the other side (e.g., the front side) of the electrode assembly 200 in the first direction, are preliminarily bonded first, the first case unit 110 and the second case unit 120 may be fixed in a state in which predetermined portions corresponding to each other correctly face each other in the third direction. Then, when the seventh regions R7 and the eighth regions R8 are bonded, the predetermined portions of the first case unit 110 may be correctly bonded to the corresponding predetermined portions of the second case unit 120.

Accordingly, it is possible to easily prevent or reduce the wrinkles generated on the pouch-type battery case 100 at low cost with the simple configuration. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

According to the embodiments of the present disclosure, the lengths of the first regions R1 of the first case unit 110 and the second case unit 120 in the first direction may each be smaller than the length of the electrode assembly 200 in the first direction or the lengths of the second regions R2 of the first case unit 110 and the second case unit 120 in the first direction may each be smaller than the length of the electrode assembly 200 in the first direction.

Accordingly, it is possible to accurately, preliminarily, and correctly bond the first regions R1 or the second regions R2 of the first case unit 110 and the second case unit 120 with the simple configuration.

According to the embodiments of the present disclosure, the other end in the first direction of the end portion of the one side in the second direction at the end portion of the other side of the electrode assembly (200) in the first direction may be positioned between one end and the other end in the first direction of each of the first regions (R1) of the first case unit (110) and the second case unit (120).

Accordingly, the first regions R1 of the first case unit 110 and the second case unit 120 may be preliminarily and correctly bonded by applying a sufficient external force to the predetermined portion of the first case unit 110 or the second case unit 120 interfered with the end portion of the other side (e.g., the front side) of the electrode assembly 200 in the first direction. Accordingly, the first case unit 110 and the second case unit 120 may be fixed in the state in which predetermined portions corresponding to each other correctly face each other in the third direction, and then when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

According to the embodiments of the present disclosure, the other end in the first direction of the end portion of the other side in the second direction at the end portion of the other side of the electrode assembly (200) in the first direction may be positioned between one end and the other end in the first direction of each of the second regions (R2) of the first case unit (110) and the second case unit (120).

Accordingly, since the other end (e.g., the front end) in the first direction of the end portion of the one side (e.g., the right side) in the second direction at the end portion of the other side (e.g., the front side) of the electrode assembly 200 in the first direction is positioned between the one end (e.g., the rear end) and the other end (e.g., the front end) of each of the second regions R2 of the first case unit 110 and the second case unit 120 in the first direction in the first direction, the second regions R2 of the first case unit 110 and the second case unit 120 may be preliminarily and correctly bonded by applying a sufficient external force to the predetermined portion of the first case unit 110 or the second case unit 120 interfered with the end portion of the other side (e.g., the front side) of the electrode assembly 200 in the first direction. Accordingly, the first case unit 110 and the second case unit 120 may be fixed in the state in which predetermined portions corresponding to each other correctly face each other in the third direction, and then when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

According to the embodiments of the present disclosure, the first regions R1 of the first case unit 110 and the second case unit 120 may be positioned at the one side of the electrode assembly 200 in the second direction from or the second regions R2 of the first case unit 110 and the second case unit 120 may be positioned at the other side of the electrode assembly 200 in the second direction from.

Accordingly, it is possible to accurately and correctly bond the first regions R1 or the second regions R2 of the first case unit 110 and the second case unit 120 with the simple configuration.

According to the embodiments of the present disclosure, the first regions R1 of the first case unit 110 and the second case unit 120 included in the first sealing regions SR1 may be included in the seventh regions R7 of the first case unit 110 and the second case unit 120 included in the second sealing regions SR2, or the second regions R2 of the first case unit 110 and the second case unit 120 included in the first sealing regions SR1 may be included in the eighth regions R8 of the first case unit 110 and the second case unit 120 included in the second sealing regions SR2.

Accordingly, it is possible to prevent or reduce the wrinkles generated on the pouch-type battery case 100. Accordingly, it is possible to prevent or reduce the defects and defect misrecognition of the pouch-type secondary battery 10 caused by the wrinkles, thereby reducing the manufacturing costs and the return/exchange costs, improving the aesthetic sense of the pouch-type secondary battery 10 due to the reduction of the wrinkles, and increasing sales.

According to the embodiments of the present disclosure, the electrode assembly 200 may have the quadrangular cross section extending in the first direction and the second direction and thus include the first corner C1 positioned at the one side in the first direction and one side in the second direction, the second corner C2 positioned at the one side in the first direction and the other side in the second direction, the third corner C3 positioned at the other side in the first direction and the one side in the second direction, and the fourth corner C4 positioned at the other side in the first direction and the other side in the second direction. The first regions R1 may be adjacent to the third corner C3. The second regions R2 may be adjacent to the fourth corner C4.

Accordingly, when the electrode assembly 200 has the quadrangular cross section extending in the first direction and the second direction and includes the four corners C1, C2, C3, and C4, since the first regions R1 or the second regions R2 of the first case unit 110 and the second case unit 120, which are adjacent to the third corner C3 or the fourth corner C4 at the other side of the electrode assembly 200 in the first direction, are preliminarily bonded first, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first case unit 110 and the second case unit 120 may be fixed in the state in which predetermined portions corresponding to each other correctly face each other in the third direction. Then, when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

According to the embodiments of the present disclosure, the first sealing regions SR1 may further include the third regions R3 of the extensions 114 and 124 of the first case unit 110 and the second case unit 120, which are positioned at the one side of the first regions R1 of the first case unit 110 and the second case unit 120 in the first direction and face each other, further include the fifth regions R5 of the extensions 114 and 124 of the first case unit 110 and the second case unit 120, which are positioned at the other side of the first regions R1 of the first case unit 110 and the second case unit 120 in the first direction and face each other, further include the fourth regions R4 of the extensions 114 and 124 of the first case unit 110 and the second case unit 120, which are positioned at the one side of the second regions R2 of the first case unit 110 and the second case unit 120 in the first direction and face each other, or further include the sixth regions R6 of the extensions 114 and 124 of the first case unit 110 and the second case unit 120 which are positioned at the other side of the second regions R2 of the first case unit 110 and the second case unit 120 in the first direction and face each other.

Accordingly, since the third regions R3, the fifth regions R5, the fourth regions R4, or the sixth regions R6 of the first case unit 110 and the second case unit 120 as well as the first regions R1 or the second regions R2 of the first case unit 110 and the second case unit 120 are preliminarily bonded first, even when the second case unit 120 or the first case unit 110 is interfered with the end portion of the other side (e.g., the front side) of the electrode assembly 200 in the first direction and thus the first case unit 110 and the second case unit 120 are partially spaced apart from each other in the third direction, the first case unit 110 and the second case unit 120 may be fixed in the state in which predetermined portions corresponding to each other face each other in the third direction. Then, when the seventh regions R7 or the eighth regions R8 are bonded, the predetermined portions of the first case unit 110 may be correctly bonded to the corresponding predetermined portions of the second case unit 120. Accordingly, it is possible to easily prevent or reduce the wrinkles generated on the pouch-type battery case 100 at low cost with the simple configuration.

In addition to the above-described effects, specific effects of the present disclosure will be described together with the above detailed description for implementing the present disclosure.

It should be understood that the described embodiments are illustrative in all respects and not restrictive, and the scope of the present disclosure will be indicated by the following claims rather than the described detailed description. And the meaning and scope of the claims to be described later, as well as all changes and modifications derived from the equivalent concept should be interpreted as being included in the scope of the present disclosure.

Although the present disclosure has been described with reference to the exemplified drawings, it is to be understood that the present disclosure is not limited to the embodiments and drawings disclosed in this specification, and those skilled in the art will appreciate that various modifications are possible without departing from the scope and idea of the present disclosure. Further, although the operating effects according to the configuration of the present disclosure are not explicitly described while describing an embodiment of the present disclosure, it should be appreciated that predictable effects are also to be recognized by the configuration.

DESCRIPTION OF REFERENCE NUMERALS

| | |
|---|---|
| 10: pouch-type secondary battery | |
| 100: pouch-type battery case | |
| 110: first case unit | 112: accommodation portion |
| 114: extension | |
| 120: second case unit | 122: accommodation portion |
| 124: extension | |
| SR1: first sealing region | R1: first region |
| R2: second region | R3: third region |
| R4: fourth region | R5: fifth region |
| R6: sixth region | |
| SR2: second sealing region | R8: eighth region |
| R8: seventh region | |
| 200: electrode assembly | 210: terminal |
| C1: first corner | C2: second corner |
| C3: third corner | C4: fourth corner |

The invention claimed is:

1. A pouch-type secondary battery comprising:

a pouch-type battery case including a first case unit extending along a first direction and a second direction intersecting the first direction, the first direction having a first side and a second side opposite to the first side and the second direction having a third side and a fourth side opposite to the third side, and a second case unit with an end portion in the first direction connected to an end portion of the first side of the first case unit being bent with respect to the first case unit to face the first case unit in a third direction intersecting the first direction and the second direction to cover the first case unit; and an electrode assembly accommodated between the first case unit and the second case unit, wherein each of the first case unit and the second case unit include an accommodation portion in contact with or facing the electrode assembly and an extension that extends outward from the accommodation portion and at least partially surrounding the accommodation portion, the extension configured to be bondable, the electrode assembly being disposed between the accommodation portions of the first case unit and the second case unit, the extensions of the first case unit and the second case unit include first sealing regions bonded to face each other in a pre-sealing operation and second sealing regions bonded to face each other in a main sealing operation after the pre-sealing operation, the first sealing regions include first regions or second regions of the extensions of the first case unit and the second case unit, the first regions are adjacent to an end portion of the third side of the electrode assembly at an end portion of the second side of the electrode assembly and face each other and the second regions are adjacent to an end portion of the fourth side of the electrode assembly at an end portion of the second side of the electrode assembly and face each other, and the second sealing regions include seventh regions or eighth regions of the extensions of the first case unit and the second case unit, the seventh regions positioned at the third side of the electrode assembly and facing each other and the eighth regions positioned at the fourth side of the electrode assembly and facing each other wherein lengths of the first regions and the second regions in the first direction are each smaller than a length of the electrode assembly in the first direction, and wherein the seventh regions have a greater total length in the first direction than the first regions, and the eighth regions have a greater total length in the first direction than the second regions.

2. The pouch-type secondary battery of claim 1, wherein the accommodation portion of the second case unit has a concave shape to accommodate at least a part of the electrode assembly.

3. The pouch-type secondary battery of claim 1, wherein the first sealing regions of the first case unit and the second case unit include the first regions and the second regions of the first case unit and the second case unit, and the second sealing regions of the first case unit and the second case unit include the seventh regions and the eighth regions of the first case unit and the second case unit.

4. The pouch-type secondary battery of claim 1, wherein, an end of the second side of the end portion of the third side at the end portion of the second side of the electrode assembly is positioned, in the first direction, between one end and the other end of each of the first regions of the first case unit and the second case unit.

5. The pouch-type secondary battery of claim 1, wherein, an end of the second side of the end portion of the fourth side at the end portion of the second side of the electrode assembly is positioned, in the first direction, between one end and the other end of each of the second regions of the first case unit and the second case unit.

6. The pouch-type secondary battery of claim 1, wherein the first regions of the first case unit and the second case unit are positioned at the third side of the electrode assembly, or the second regions of the first case unit and the second case unit are positioned at the fourth side of the electrode assembly.

7. The pouch-type secondary battery of claim 1, wherein the first regions of the first case unit and the second case unit included in the first sealing regions are included in the seventh regions of the first case unit and the second case unit included in the second sealing regions, or the second regions of the first case unit and the second case unit included in the first sealing regions are included in the eighth regions of the first case unit and the second case unit included in the second sealing regions.

8. The pouch-type secondary battery of claim 1, wherein the electrode assembly has a quadrangular cross section extending in the first direction and the second direction and includes a first corner positioned at the first side and the third side, a second corner positioned at the first side and the fourth side, a third corner positioned at the second side and the third side, and a fourth corner positioned at the second side and the fourth side, the first regions being adjacent to the third corner, and the second regions being adjacent to the fourth corner.

9. The pouch-type secondary battery of claim 1, wherein the first sealing regions further include third, fourth, fifth or sixth regions, the third regions of the extensions of the first case unit and the second case unit being positioned at the first side of the first regions of the first case unit and the second case unit facing each other, the fifth regions of the extensions of the first case unit and the second case unit being positioned at the second side of the first regions of the first case unit and the second case unit facing each other, the fourth regions of the extensions of the first case unit and the second case unit being positioned at the first side of the second regions of the first case unit and the second case unit facing each other, the sixth regions of the extensions of the first case unit and the second case unit being positioned at the second side of the second regions of the first case unit and the second case unit facing each other.

* * * * *